(12) United States Patent
Chang et al.

(10) Patent No.: US 11,653,077 B2
(45) Date of Patent: *May 16, 2023

(54) CAMERA MODULE AND ELECTRONIC DEVICE

(71) Applicant: LARGAN DIGITAL CO., LTD., Taichung (TW)

(72) Inventors: Lin-An Chang, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,438

(22) Filed: Jan. 7, 2022

(65) Prior Publication Data
US 2022/0132008 A1    Apr. 28, 2022

Related U.S. Application Data

(63) Continuation of application No. 17/024,988, filed on Sep. 18, 2020.

(30) Foreign Application Priority Data

Feb. 24, 2020 (TW) .................................. 109105900

(51) Int. Cl.
*H04N 5/225* (2006.01)
*G02B 7/182* (2021.01)
*G02B 7/02* (2021.01)

(52) U.S. Cl.
CPC .......... *H04N 5/2254* (2013.01); *G02B 7/021* (2013.01); *G02B 7/022* (2013.01); *G02B 7/1828* (2013.01)

(58) Field of Classification Search
CPC .... H04N 5/2254; H04N 5/2257; G02B 7/021; G02B 7/022; G02B 7/1828; G02B 7/08; G02B 27/646; G03B 17/17; G03B 13/36
See application file for complete search history.

(56) References Cited

U.S. PATENT DOCUMENTS

| 4,963,912 A | 10/1990 | Suda et al. |
| 6,337,776 B1 | 1/2002 | Kamo |
| 7,563,037 B2 | 7/2009 | Chang |
| 7,909,519 B2 | 3/2011 | Iwase |

(Continued)

FOREIGN PATENT DOCUMENTS

| CN | 2636265 Y | 8/2004 |
| CN | 2665732 Y | 12/2004 |

(Continued)

*Primary Examiner* — Chiawei Chen
(74) *Attorney, Agent, or Firm* — McClure, Qualey & Rodack, LLP

(57) ABSTRACT

A camera module includes an imaging lens assembly, an image sensor, a first reflecting member and a first driving apparatus. The imaging lens assembly is for converging an imaging light on an image surface. The image sensor is disposed on the image surface. The first reflecting member is located on an image side of the imaging lens assembly, the first reflecting member is for folding the imaging light, and has a first translational degree of freedom. The first reflecting member is assembled on the first driving apparatus, and the first driving apparatus is for driving the first reflecting member moving along the first translational degree of freedom.

12 Claims, 24 Drawing Sheets

(56) References Cited

U.S. PATENT DOCUMENTS

| | | | |
|---|---|---|---|
| 9,635,264 B2 | 4/2017 | Nomura et al. | |
| 10,126,633 B2 | 11/2018 | Avivi et al. | |
| 10,133,038 B2 | 11/2018 | Hu et al. | |
| 10,133,152 B2 | 11/2018 | Kang et al. | |
| 10,178,317 B2 | 1/2019 | Lee et al. | |
| 10,334,146 B2 | 6/2019 | Im et al. | |
| 10,520,747 B2 | 12/2019 | Wang et al. | |
| 10,866,430 B2 | 12/2020 | Kim et al. | |
| 11,375,091 B1* | 6/2022 | Mireault | G02B 5/045 |
| 2002/0018615 A1* | 2/2002 | Laor | G02B 6/3572 |
| | | | 385/18 |
| 2006/0018651 A1* | 1/2006 | Cho | G02B 26/0833 |
| | | | 396/111 |
| 2007/0053673 A1* | 3/2007 | Seo | H04N 5/232121 |
| | | | 348/E5.045 |
| 2016/0353008 A1* | 12/2016 | Osborne | H04N 5/2258 |
| 2017/0242225 A1* | 8/2017 | Fiske | G02B 13/001 |
| 2018/0329276 A1* | 11/2018 | Hu | G03B 17/17 |
| 2018/0343391 A1* | 11/2018 | Goldenberg | H04N 5/23248 |
| 2018/0364450 A1 | 12/2018 | Lee et al. | |
| 2019/0146238 A1* | 5/2019 | Chan | H04N 5/23296 |
| | | | 348/208.1 |
| 2019/0227199 A1* | 7/2019 | Kao | G02B 7/102 |
| 2019/0227201 A1* | 7/2019 | Kao | G02B 7/182 |
| 2020/0081321 A1 | 3/2020 | Tseng et al. | |
| 2020/0329181 A1* | 10/2020 | Lee | H04N 17/002 |
| 2021/0080690 A1* | 3/2021 | Lee | G02B 13/0065 |
| 2021/0136261 A1 | 5/2021 | Lee | |
| 2021/0366968 A1* | 11/2021 | Carrion | H01L 27/14627 |

FOREIGN PATENT DOCUMENTS

| | | |
|---|---|---|
| CN | 2672676 Y | 1/2005 |
| CN | 2689628 Y | 3/2005 |
| CN | 100561270 C | 11/2009 |
| CN | 101414106 B | 8/2010 |
| CN | 109725474 A | 5/2019 |
| CN | 208937880 U | 6/2019 |
| CN | 110609377 A | 12/2019 |
| KR | 101901705 B1 | 9/2018 |
| TW | 201833616 A | 9/2018 |
| TW | 672538 B | 9/2019 |
| WO | 2019150188 A1 | 8/2019 |
| WO | 2019198956 A1 | 10/2019 |

* cited by examiner

CAMERA MODULE AND ELECTRONIC DEVICE

RELATED APPLICATIONS

The present application is a continuation of the application Ser. No. 17/024,988, filed Sep. 18, 2020, which claims priority to Taiwan Application Serial Number 109105900, filed Feb. 24, 2020, which is herein incorporated by reference.

BACKGROUND

Technical Field

The present disclosure relates to a camera module. More particularly, the present disclosure relates to a camera module applicable to portable electronic devices.

Description of Related Art

In recent years, portable electronic devices have developed rapidly. For example, intelligent electronic devices and tablets have been filled in the lives of modern people, and camera modules mounted on portable electronic devices have also prospered. However, as technology advances, the quality requirements of the camera modules are becoming higher and higher. Therefore, a camera module, which the focusing distance can be shortened, needs to be developed.

SUMMARY

According to one aspect of the present disclosure, a camera module includes an imaging lens assembly, an image sensor, a first reflecting member and a first driving apparatus. The imaging lens assembly is for converging an imaging light on an image surface. The image sensor is disposed on the image surface. The first reflecting member is located on an image side of the imaging lens assembly, the first reflecting member is for folding the imaging light, and has a first translational degree of freedom. The first reflecting member is assembled on the first driving apparatus, and the first driving apparatus is for driving the first reflecting member moving along the first translational degree of freedom. When the first reflecting member is close to the imaging lens assembly, the first reflecting member is simultaneously close to the image sensor; when the first reflecting member is away from the imaging lens assembly, the first reflecting member is simultaneously away from the image sensor.

According to one aspect of the present disclosure, an electronic device includes the camera module of the aforementioned aspect.

According to one aspect of the present disclosure, a camera module includes an imaging lens assembly, an image sensor, a first reflecting member and a first driving apparatus. The imaging lens assembly is for converging an imaging light on an image surface. The image sensor is disposed on the image surface. The first reflecting member is located on an image side of the imaging lens assembly, and the first reflecting member is for folding the imaging light. The first reflecting member is assembled on the first driving apparatus, and the first driving apparatus includes a supporting member, a moving holder, at least two magnets and at least two magnetic members. The first reflecting member is assembled on the moving holder, and the first reflecting member relatively moves between the moving holder and the supporting member. The magnets are disposed on the moving holder. The magnetic members are disposed on the supporting member, and the magnetic members are corresponding to the magnets. A magnetic force is formed between the magnets and the magnetic members. The first reflecting member includes at least two reflecting surfaces. The reflecting surfaces, the magnetic members and the magnets are symmetrical arranged, and the reflecting surfaces, the magnets and the magnetic members are symmetrical arranged along a symmetry axis, respectively.

BRIEF DESCRIPTION OF THE DRAWINGS

FIG. 10 is a partially schematic view of the camera module according to the 1st example in FIG. 1A.

DETAILED DESCRIPTION

Figure 1A:
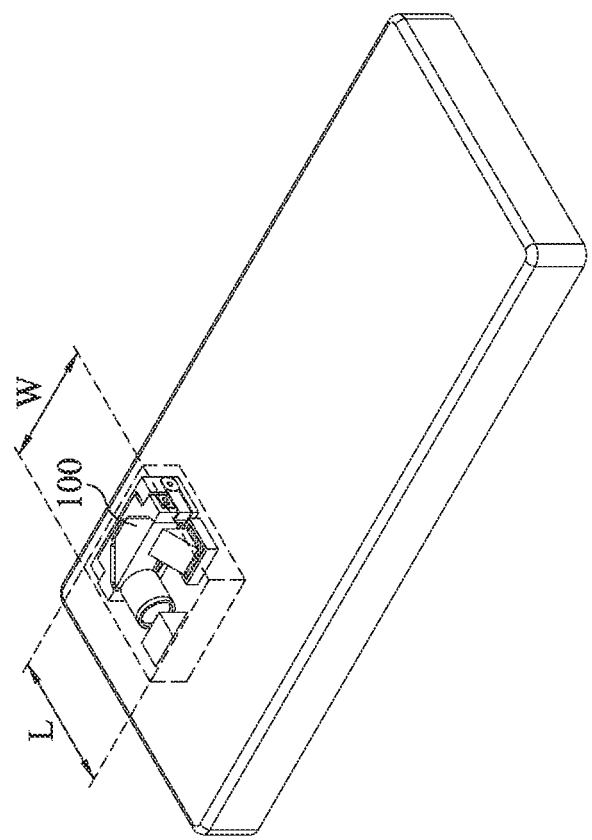
FIG. 1A is a schematic view of an electronic device according to the 1st example of the present disclosure.

The present disclosure provides a camera module, and the camera module includes an imaging lens assembly, an image sensor, a first reflecting member and a first driving apparatus. The imaging lens assembly is for converging an imaging light on an image surface. The image sensor is disposed on the image surface. The first reflecting member is located on an image side of the imaging lens assembly, and the first reflecting member is for folding the imaging light. The first reflecting member is assembled on the first driving apparatus. Therefore, the camera module for driving the first reflecting member can be provided, and it is favorable for shortening an operation distance of the first driving apparatus to more quickly control the image.

The first reflecting member can have two translational degrees of freedom, and the translational degrees of freedom are substantially orthogonal, wherein each of the translational degrees of freedom can be a first translational degree of freedom and a second translational degree of freedom. That is, the first translational degree of freedom and the second translational degree of freedom are substantially orthogonal. In particular, the first reflecting member having the first translational degree of freedom is regarded that the first reflecting member can move along a specific direction at a specific surface. Therefore, the moving ability of the first reflecting member at the two-dimensional surface can be provided, and the imaging light can be more flexibly controlled.

The first driving apparatus can be for driving the first reflecting member moving along the first translational degree of freedom, wherein the first driving apparatus has the functions of the autofocus and the optical image stabilization, and a driving displacement of the first reflecting member along the first translational degree of freedom is smaller than a variation of back focal length of the camera module. Furthermore, the first driving apparatus can be at least one of an autofocus driving apparatus and an optical image stabilization driving apparatus, and the imaging lens assembly can be a telephoto lens assembly with long focal length. The entire space can be reduced via the first reflecting member to obtain the more efficient space application, and the feasibility of the compact size of the camera module can be provided.

When the first reflecting member is close to the imaging lens assembly, the first reflecting member is simultaneously close to the image sensor; when the first reflecting member is away from the imaging lens assembly, the first reflecting member is simultaneously away from the image sensor. It should be mentioned that the long-driving-path function is hardly obtained when the telephoto lens assembly has the higher focal variations. Therefore, the present disclosure is favorable for solving the aforementioned problem, that is, the focusable range of the telephoto lens assembly can be widened.

The first driving apparatus can include a supporting member, a moving holder, at least one magnet and at least one magnetic member. Moreover, the first driving apparatus can include at least two magnets and at least two magnetic members, but is not limited thereto. The first reflecting member is assembled on the moving holder, and the first reflecting member relatively moves between the supporting member and the moving holder. The magnets are disposed on the moving holder. The magnetic members are disposed on the supporting member, and the magnetic members are corresponding to the magnets. A magnetic force is formed between the magnets and the magnetic members. In detail, the magnetic force between the magnets and the magnetic members is a force attracting each other. Therefore, the preloading force between the moving holder and the supporting member can be provided, and it is favorable for enhancing the structural stability of the first driving apparatus.

The first reflecting member can include at least two reflecting surfaces, and the reflecting surfaces move towards a same direction via the first driving apparatus. Therefore, the volume of the camera module can be substantially reduced via the structure of secondary reflection.

Both of a number of the magnetic members and a number of the magnets can be at least two, the reflecting surfaces, the magnetic members and the magnets are symmetrical arranged, and the reflecting surfaces, the magnetic members and the magnets are symmetrical arranged along a symmetry axis, respectively. Therefore, the assembling difficulty of the camera module can be simplified, and the skew situation during the assembly and the production of the camera module can be avoided to promote the production yield rate of the entire camera module.

A groove can be included between the supporting member and the moving holder, the groove extends along the first translational degree of freedom, and a rolling member is disposed on the groove. Therefore, the skew situation caused by the first driving apparatus can be improved to increase the linear stability of the movement.

The first driving apparatus can include a coil, and a driving force is formed along the first translational degree of freedom via the coil with the magnets. Therefore, the autofocus function of the camera module can be obtained.

The camera module can further include a second driving apparatus, and the second driving apparatus is for driving the first reflecting member moving along the second translational degree of freedom. Therefore, it is favorable for obtaining the optical image stabilization.

The camera module can further include a second reflecting member and a third driving apparatus, wherein the second reflecting member has a rotational degree of freedom, and the third driving apparatus is for driving the second reflecting member rotating along the rotational degree of freedom. Therefore, the optical image stabilization of the camera module in another dimension can be obtained.

The first reflecting member can include an incident surface and an exiting surface, and at least one of the incident surface and the exiting surface has an aspheric surface. Therefore, the first reflecting member can have refractive power to compensate optical aberrations.

Each of the imaging lens assembly and the image sensor can have a fixed relative position, and the first reflecting member moves correspondingly to the imaging lens assembly and the image sensor. Therefore, it is favorable for lowering the complexity of the assembling process and enhancing the assembling efficiency.

The camera module can further include a third reflecting member, the third reflecting member has the rotational degree of freedom, and the third driving apparatus is for driving the third reflecting member rotating along the rotational degree of freedom. Therefore, the optical image stabilization of the camera module in another dimension can be obtained.

When a refractive index of the first reflecting member at d-line is N, the following condition can be satisfied: $1.66 \leq N < 2.5$. Moreover, the first reflecting member can be made of a plastic material or a glass material. Therefore, increasing the range of the reflecting angle is favorable for reducing the volume of the first reflecting member. Further, the following condition can be satisfied: $1.70 \leq N < 2.5$.

When a thickness of the first reflecting member is H, the following condition can be satisfied: 3.00 mm H 10.00 mm. The aforementioned range is the thickness range that the imaging light can be stabilized via the first reflecting member in the limited space. Therefore, the superior optical quality of the camera module of the compact size can be obtained.

When a length of the camera module is L, and a width of the camera module is W, the following condition can be satisfied: $0.7 < L/W < 3.5$. Moreover, the calculation of the length of the camera module is according to the direction of the optical axis of the imaging lens assembly, and the calculation of the width of the camera module is according to the direction vertical to the optical axis. Therefore, it is favorable for shortening the proportional range of the elongated telephoto camera module. Further, the following condition can be satisfied: $0.8 < L/W < 2.5$. Therefore, the proportional range of the entire volume of the telephoto camera module can be further reduced.

Each of the aforementioned features of the camera module can be utilized in various combinations for achieving the corresponding effects.

The present disclosure provides an electronic device, which includes the aforementioned camera module.

According to the aforementioned embodiment, specific examples are provided, and illustrated via figures.

1st Example

Figure 1B:
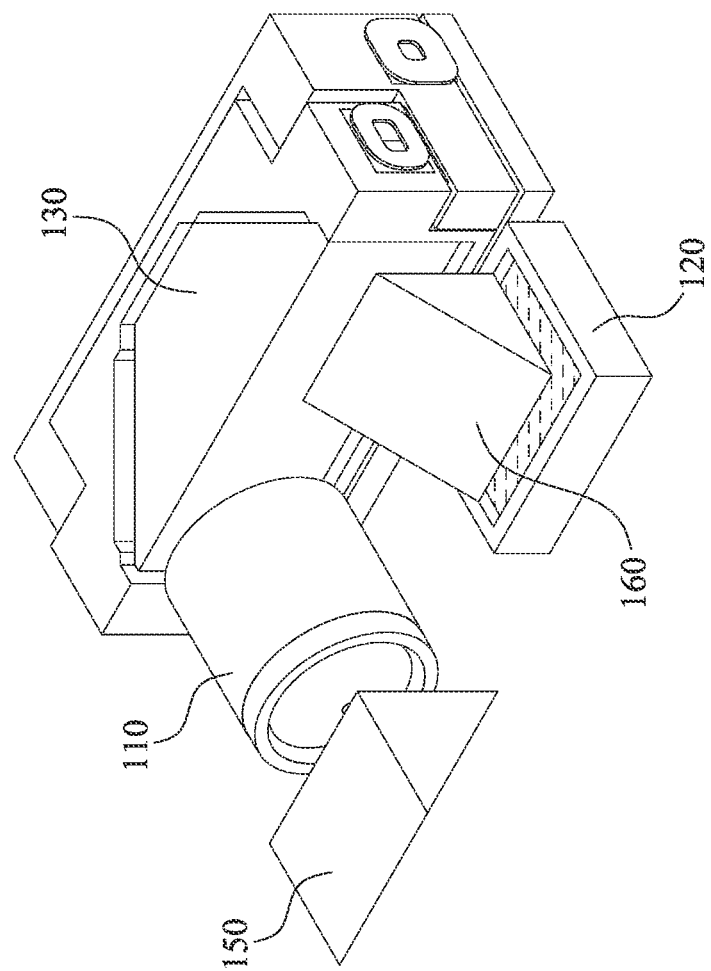
FIG. 1B is a schematic view of a camera module according to the 1st example in FIG. 1A.

FIG. 1A is a schematic view of an electronic device 10 according to the 1st example of the present disclosure. FIG. 1B is a schematic view of a camera module 100 according to the 1st example in FIG. 1A. In FIGS. 1A and 1B, the electronic device 10 includes the camera module 100, and the camera module 100 includes an imaging lens assembly 110, an image sensor 120, a first reflecting member 130, a first driving apparatus 140 (as shown in FIG. 1D), a second driving apparatus 170 (as shown in FIG. 1D), a second reflecting member 150, a third driving apparatus 180 (as shown in FIG. 1F) and a third reflecting member 160, wherein the third driving apparatus 180 is an image-side driving apparatus, the second reflecting member 150 is an object-side reflecting member, and the third reflecting member 160 is an image-side reflecting member. The first driving apparatus 140 can be at least one of an autofocus driving apparatus and an optical image stabilization driving apparatus, and the imaging lens assembly 110 can be a telephoto lens assembly with long focal length, but are not limited thereto.

The imaging lens assembly 110 is for converging an imaging light on an image surface (its reference numeral is omitted), and the image sensor 120 is disposed on the image surface. The first reflecting member 130 is located on an image side of the imaging lens assembly 110, assembled on the first driving apparatus 140, and for folding the imaging light. In detail, the imaging light enters the camera module 100 from an incident surface (its reference numeral is omitted) of the second reflecting member 150, and the imaging light is converged on the image surface via the imaging lens assembly 110. The first driving apparatus 140 has the function of the autofocus, and the second driving apparatus 170 and the third driving apparatus 180 have the function of the optical image stabilization.

In FIG. 1B, each of the imaging lens assembly 110 and the image sensor 120 has a fixed relative position, and the first reflecting member 130 moves correspondingly to the imaging lens assembly 110 and the image sensor 120. Therefore, it is favorable for lowering the complexity of the assembling process and enhancing the assembling efficiency.

Furthermore, when the first reflecting member 130 is close to the imaging lens assembly 110, the first reflecting member 130 is simultaneously close to the image sensor 120; when the first reflecting member 130 is away from the imaging lens assembly 110, the first reflecting member 130 is simultaneously away from the image sensor 120. In particular, the camera module 100 for driving the first reflecting member 130 can be provided via the present disclosure, and it is favorable for shortening an operation distance of the first driving apparatus 140, the second driving apparatus 170 and the third driving apparatus 180 to more quickly control the image.

The entire space can be reduced via the first reflecting member 130 to obtain the more efficient space application, and the feasibility of the compact size of the camera module 100 can be provided. It should be mentioned that the long-driving-path function is hardly obtained when the telephoto lens assembly has the higher focal variations. Therefore, the present disclosure is favorable for solving the aforementioned problem, that is, the focusable range of the telephoto lens assembly can be widened.

Figure 1C:
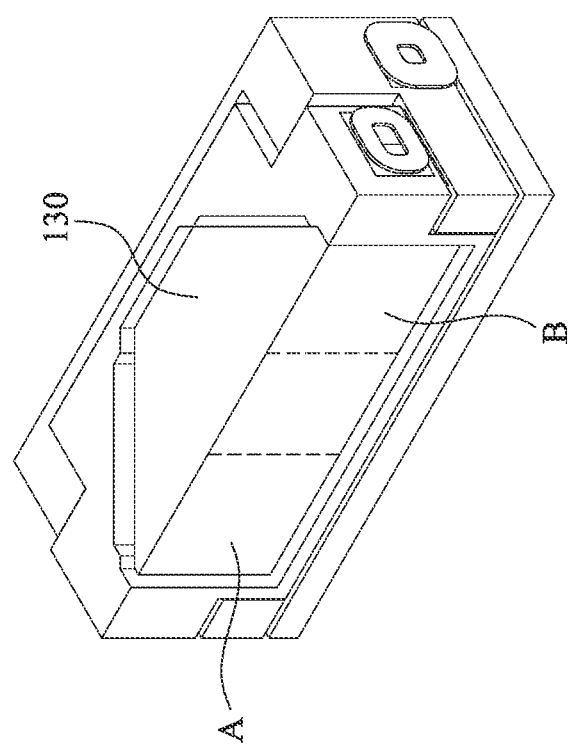
FIG. 1D is an exploded schematic view of the first reflecting member, the first driving apparatus and the second driving apparatus according to the 1st example in FIG. 1A.
FIG. 1E is a top view of the camera module according to the 1st example in FIG. 1A.
FIG. 1F is a schematic view of a rotational degree of freedom of the third reflecting member according to the 1st example in FIG. 1A.
FIG. 1G is a schematic view of parameters of the first reflecting member according to the 1st example in FIG. 1A.
Figure 1D:
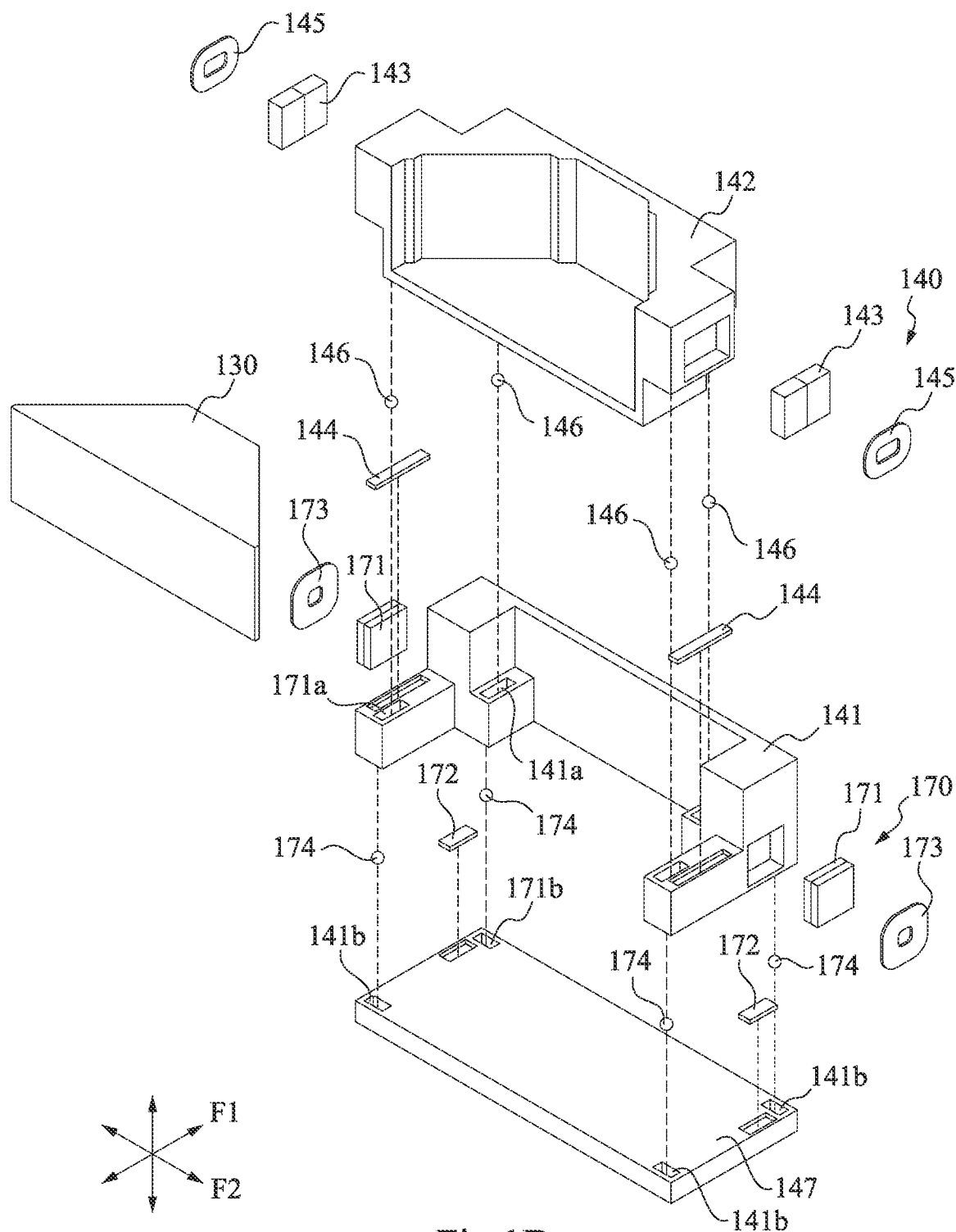
Figure 1E:
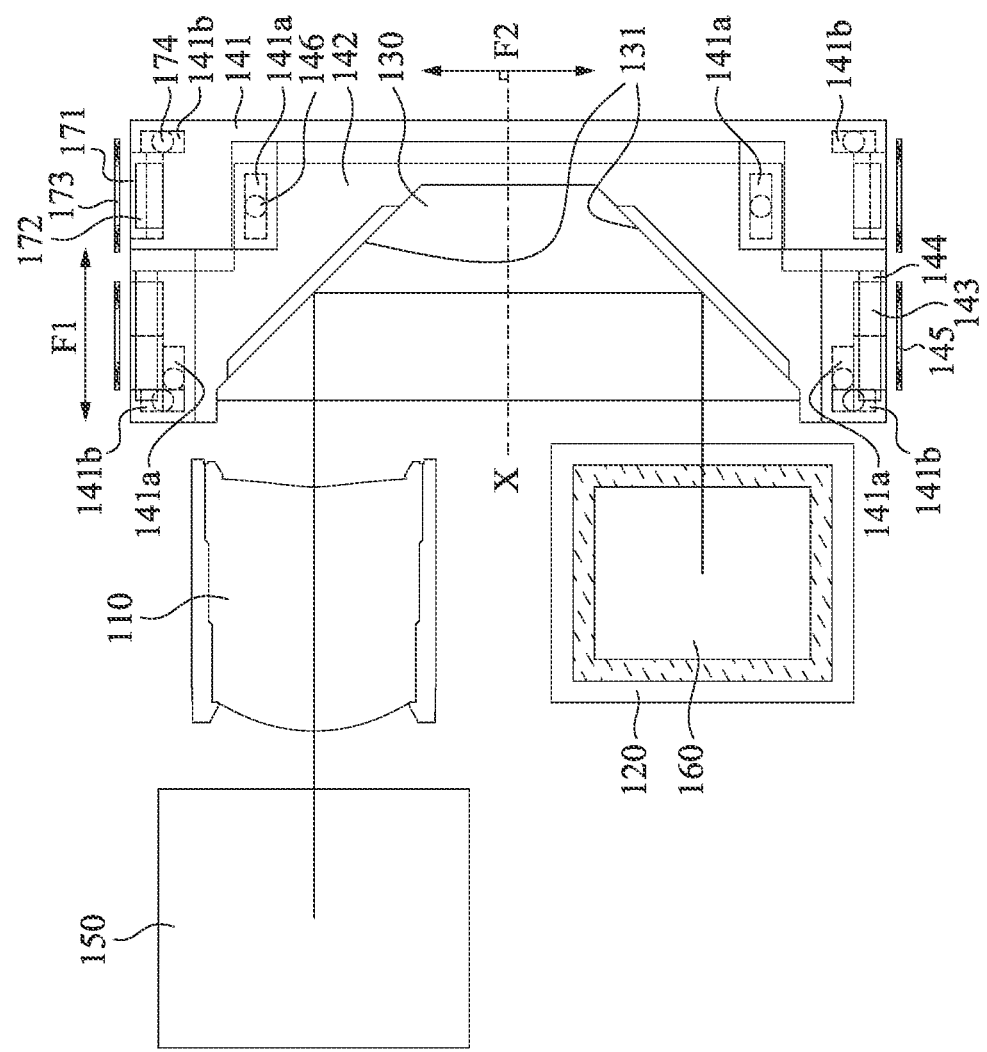

FIG. 1C is a partially schematic view of the camera module 100 according to the 1st example in FIG. 1A. In FIG. 1O, the first reflecting member 130 includes an incident surface A, an exiting surface B and at least two reflecting surfaces 131 (as shown in FIG. 1E), wherein the imaging light can be folded from the incident surface A to the exiting surface B, and the reflecting surfaces 131 move towards a same direction via the first driving apparatus 140. Therefore, the volume of the camera module 100 can be substantially reduced via the structure of secondary reflection. In detail, the first reflecting member 130 can be made of a plastic material or a glass material. According to the 1st example, the first reflecting member 130 is made of the plastic material, but is not limited thereto. Therefore, the camera module 100 has the design flexibility under the consideration of optical design, and it is favorable for developing the plastic material with high refractivity and lowering the developing threshold of the optical element with double reflecting surface.

The first driving apparatus 140 can include a supporting member 141, a moving holder 142, at least one magnet, at least one magnetic member, a coil, a plurality of rolling members and a holder 147. FIG. 1D is an exploded schematic view of the first reflecting member 130, the first driving apparatus 140 and the second driving apparatus 170 according to the 1st example in FIG. 1A. In FIG. 1D, according to the 1st example, the first driving apparatus 140 includes the supporting member 141, the moving holder 142, a first magnet 143, a first magnetic member 144, first coils 145, first rolling members 146 and the holder 147, and the second driving apparatus 170 includes a second magnet 171, a second magnetic member 172, second coils 173 and second rolling members 174.

According to the 1st example, a number of the first magnets 143 is two, a number of the first magnetic members 144 is two, a number of the first coils 145 is two, a number of the first rolling members 146 is four, a number of the second magnets 171 is two, a number of the second magnetic members 172 is two, a number of the second coils 173 is two, a number of the second rolling members 174 is four, but are not limited thereto.

In detail, the first reflecting member 130 is assembled on the moving holder 142, and the first reflecting member 130 relatively moves between the moving holder 142 and the supporting member 141. The magnets are disposed on the moving holder 142. The magnetic members are disposed on the supporting member 141, and the magnetic members are corresponding to the magnets. A magnetic force is formed between the magnets and the magnetic members. According to the 1st example, each of the first magnets 143 and the second magnets 171 is disposed on the moving holder 142 and the supporting member 141, each of the first magnetic members 144 and the second magnetic members 172 is disposed on the supporting member 141 and the holder 147, the first magnets 143 are corresponding to the first magnetic members 144, and the second magnets 171 are corresponding to the second magnetic members 172. The magnetic force is formed between the first magnets 143 and the first magnetic members 144, and the magnetic force is formed between the second magnets 171 and the second magnetic members 172. Both of the magnetic force between the first magnets 143 and the first magnetic members 144 and the magnetic force between the second magnets 171 and the second magnetic members 172 are the forces attracting each other. Therefore, the preloading force between the moving holder 142 and the supporting member 141 can be provided, and it is favorable for enhancing the structural stability of the first driving apparatus 140 and the second driving apparatus 170.

FIG. 1E is a top view of the camera module 100 according to the 1st example in FIG. 1A. In FIGS. 1D and 1E, each of the first driving apparatus 140 and the second driving apparatus 170 is for driving the first reflecting member 130 moving along two translational degrees of freedom, and each of the translational degrees of freedom is a first translational degree of freedom F1 and a second translational degree of freedom F2. Therefore, it is favorable for obtaining the optical image stabilization of the camera module 100. In particular, the degree of freedom can include surge, sway, heave, pitch, yaw and roll, wherein surge, sway and heave are classified as the translational degree of freedom, and pitch, yaw and roll are classified as the rotational degree of freedom.

In detail, the first reflecting member 130 has the first translational degree of freedom F1, and the first driving apparatus 140 is for driving the first reflecting member 130 moving along the first translational degree of freedom F1. That is, the first reflecting member 130 can move along the specific direction at the specific surface, and the driving displacement of the first reflecting member 130 along the first translational degree of freedom F1 is smaller than a variation of back focal length of the camera module 100. Furthermore, the first translational degree of freedom F1 is provided between the supporting member 141 and the moving holder 142, and a driving force is formed along the first translational degree of freedom F1 via the coil with the magnets. According to the 1st example, the driving force is formed along the first translational degree of freedom F1 via the first coil 145 with the first magnets 143. Therefore, the autofocus function of the camera module 100 can be obtained.

The first reflecting member 130 has the second translational degree of freedom F2, and the first translational degree of freedom F1 and the second translational degree of freedom F2 are substantially orthogonal. Therefore, the moving ability of the first reflecting member 130 at the two-dimensional surface can be provided, and the imaging light can be more flexibly controlled. Moreover, the second translational degree of freedom F2 is provided between the supporting member 141 and the holder 147, and the second driving apparatus 170 is for driving the first reflecting member 130 moving along the second translational degree of freedom F2. Therefore, it is favorable for obtaining the optical image stabilization.

In FIGS. 1D and 1E, a groove can be included between the supporting member 141 and the moving holder 142. According to the 1st example, grooves 141a are included between the supporting member 141 and the moving holder 142, and grooves 141b are included between the supporting member 141 and the holder 147. According to the 1st example, a number of the grooves 141a is four, and a number of the grooves 141b is four, but are not limited thereto.

Furthermore, the grooves 141a extend along the first translational degree of freedom F1, the grooves 141b extend along the second translational degree of freedom F2, and each of the rolling members is disposed on each of the grooves 141a, 141b. According to the 1st example, each of the first rolling members 146 is disposed on each of the grooves 141a, and each of the second rolling members 174 is disposed on each of the grooves 141b. Therefore, the skew situation caused by the first driving apparatus 140 and the second driving apparatus 170 can be improved to increase the linear stability of the movement.

In FIG. 1E, the reflecting surfaces 131, the magnetic members and the magnets are symmetrical arranged, and the reflecting surfaces 131, the magnetic members and the magnets are symmetrical arranged along a symmetry axis X, respectively. According to the 1st example, the reflecting surfaces 131, the first magnets 143, the first magnetic members 144, the second magnets 171 and the second magnetic members 172 are symmetrical arranged, and the reflecting surfaces 131, the first magnets 143, the first magnetic members 144, the second magnets 171 and the second magnetic members 172 are symmetrical arranged along the symmetry axis X, respectively. Therefore, the assembling difficulty of the camera module 100 can be simplified, and the skew situation during the assembly and the production of the camera module 100 can be avoided to promote the production yield rate of the entire camera module 100.

FIG. 1F is a schematic view of a rotational degree of freedom R of the third reflecting member 160 according to the 1st example in FIG. 1A. In FIG. 1F, the third reflecting member 160 has the rotational degree of freedom R, and the third driving apparatus 180 is for driving the third reflecting member 160 rotating along the rotational degree of freedom R. In particular, the third driving apparatus 180 is for driving the third reflecting member 160 rotating along the axis vertical to the incident light path and the exit light path. Therefore, the optical image stabilization of the camera module 100 in another dimension can be obtained.

Figure 1G:
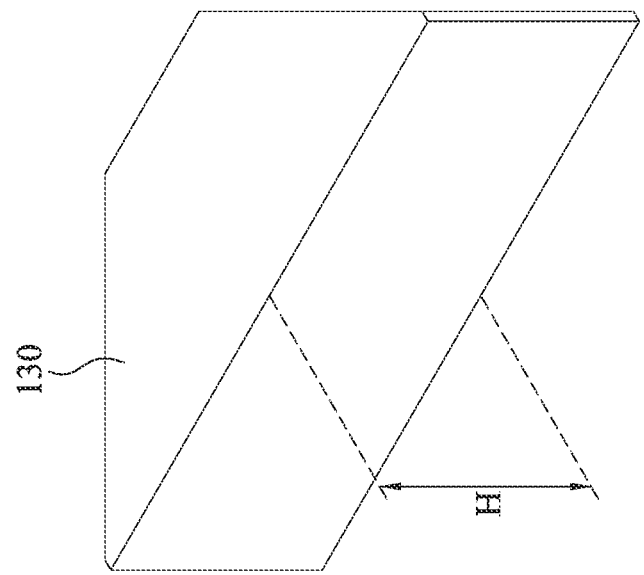
Figure 1F:
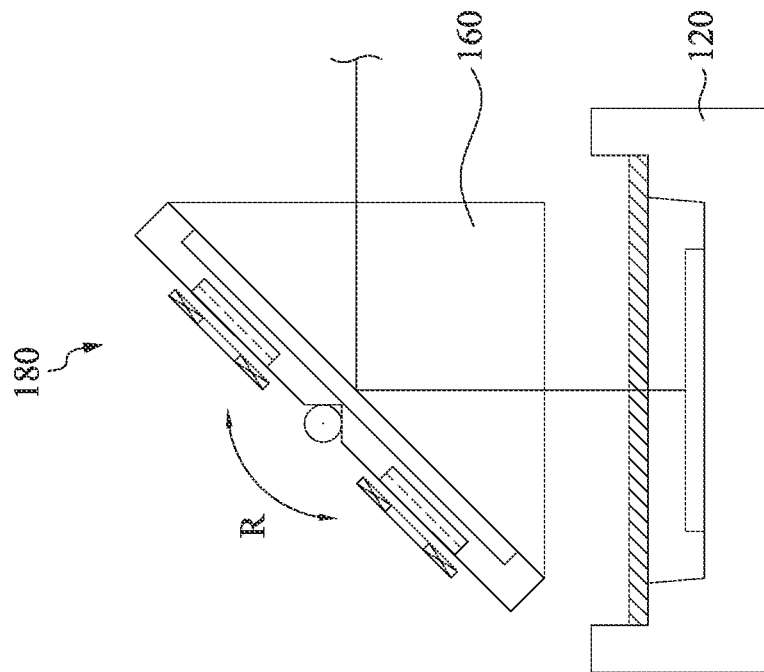

FIG. 1G is a schematic view of parameters of the first reflecting member 130 according to the 1st example in FIG. 1A. In FIGS. 1A and 1G, according to the 1st example, when a refractive index of the first reflecting member 130 at d-line is N, a wavelength of d-line is 587.6 nm, a thickness of the first reflecting member 130 is H, a length of the camera module 100 is L, and a width of the camera module 100 is W, the following conditions of the Table 1 are satisfied.

TABLE 1

| 1st example | | | |
|---|---|---|---|
| N | 1.73 | W (mm) | 19.8 |
| H (mm) | 4.5 | L/W | 1.16 |
| L (mm) | 23.0 | | |

2nd Example

Figure 2A:
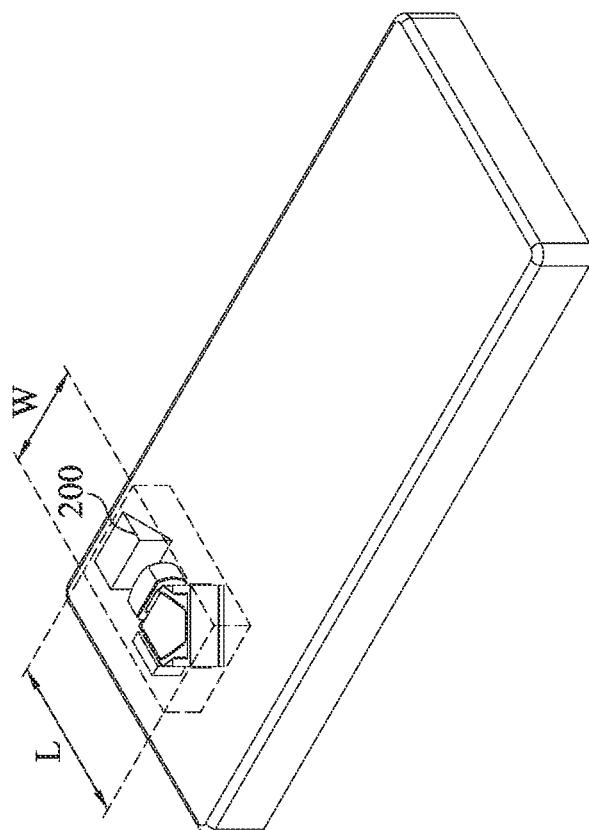
FIG. 2A is a schematic view of an electronic device according to the 2nd example of the present disclosure.
Figure 2B:
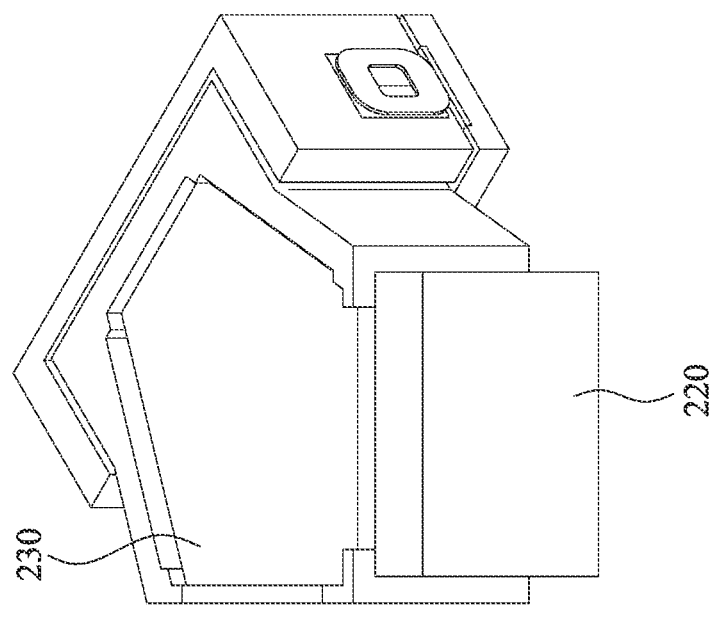
FIG. 2B is a schematic view of a camera module according to the 2nd example in FIG. 2A.
Figure 2B:
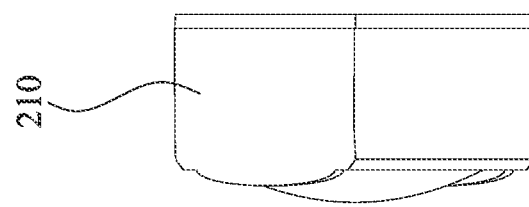
Figure 2B:
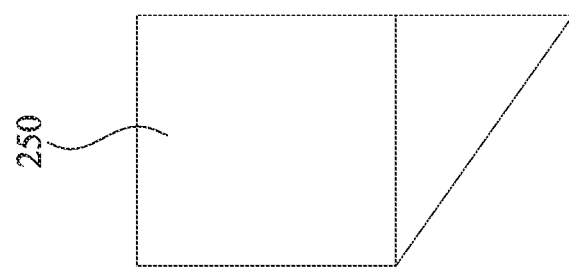

FIG. 2A is a schematic view of an electronic device 20 according to the 2nd example of the present disclosure. FIG. 2B is a schematic view of a camera module 200 according to the 2nd example in FIG. 2A. In FIGS. 2A and 2B, the electronic device 20 includes the camera module 200, and the camera module 200 includes an imaging lens assembly 210, an image sensor 220, a first reflecting member 230, a first driving apparatus 240 (as shown in FIG. 2D), a second driving apparatus 270 (as shown in FIG. 2D), a second reflecting member 250 and a third driving apparatus (not shown), wherein the third driving apparatus is an object-side driving apparatus, and the second reflecting member 250 is an object-side reflecting member. The first driving apparatus 240 can be at least one of an autofocus driving apparatus and an optical image stabilization driving apparatus, and the imaging lens assembly 210 can be a telephoto lens assembly with long focal length, but are not limited thereto.

The imaging lens assembly 210 is for converging an imaging light on an image surface (not shown), and the image sensor 220 is disposed on the image surface. The first reflecting member 230 is located on an image side of the imaging lens assembly 210, assembled on the first driving apparatus 240, and for folding the imaging light. In detail, the imaging light enters the camera module 200 from an incident surface (its reference numeral is omitted) of the second reflecting member 250, and the imaging light is converged on the image surface via the imaging lens assembly 210. The first driving apparatus 240 has the function of the autofocus, and the second driving apparatus 270 and the third driving apparatus have the function of the optical image stabilization.

In FIG. 2B, each of the imaging lens assembly 210 and the image sensor 220 has a fixed relative position, and the first reflecting member 230 moves correspondingly to the imaging lens assembly 210 and the image sensor 220. Therefore, it is favorable for lowering the complexity of the assembling process and enhancing the assembling efficiency.

Furthermore, when the first reflecting member 230 is close to the imaging lens assembly 210, the first reflecting member 230 is simultaneously close to the image sensor 220; when the first reflecting member 230 is away from the imaging lens assembly 210, the first reflecting member 230 is simultaneously away from the image sensor 220. In particular, the camera module 200 for driving the first reflecting member 230 can be provided via the present disclosure, and it is favorable for shortening an operation distance of the first driving apparatus 240, the second driving apparatus 270 and the third driving apparatus to more quickly control the image.

The entire space can be reduced via the first reflecting member 230 to obtain the more efficient space application, and the feasibility of the compact size of the camera module 200 can be provided. It should be mentioned that the long-driving-path function is hardly obtained when the telephoto lens assembly has the higher focal variations. Therefore, the present disclosure is favorable for solving the aforementioned problem, that is, the focusable range of the telephoto lens assembly can be widened.

Figure 2C:
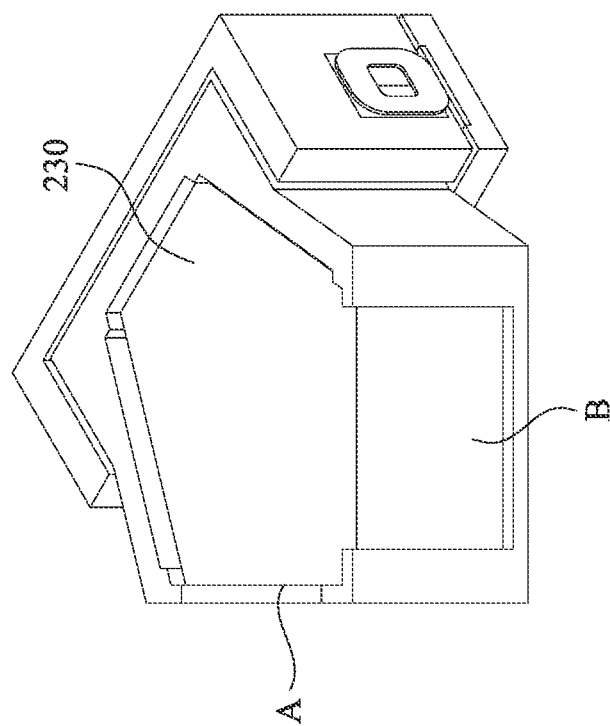
FIG. 2C is a partially schematic view of the camera module according to the 2nd example in FIG. 2A.
Figure 2D:
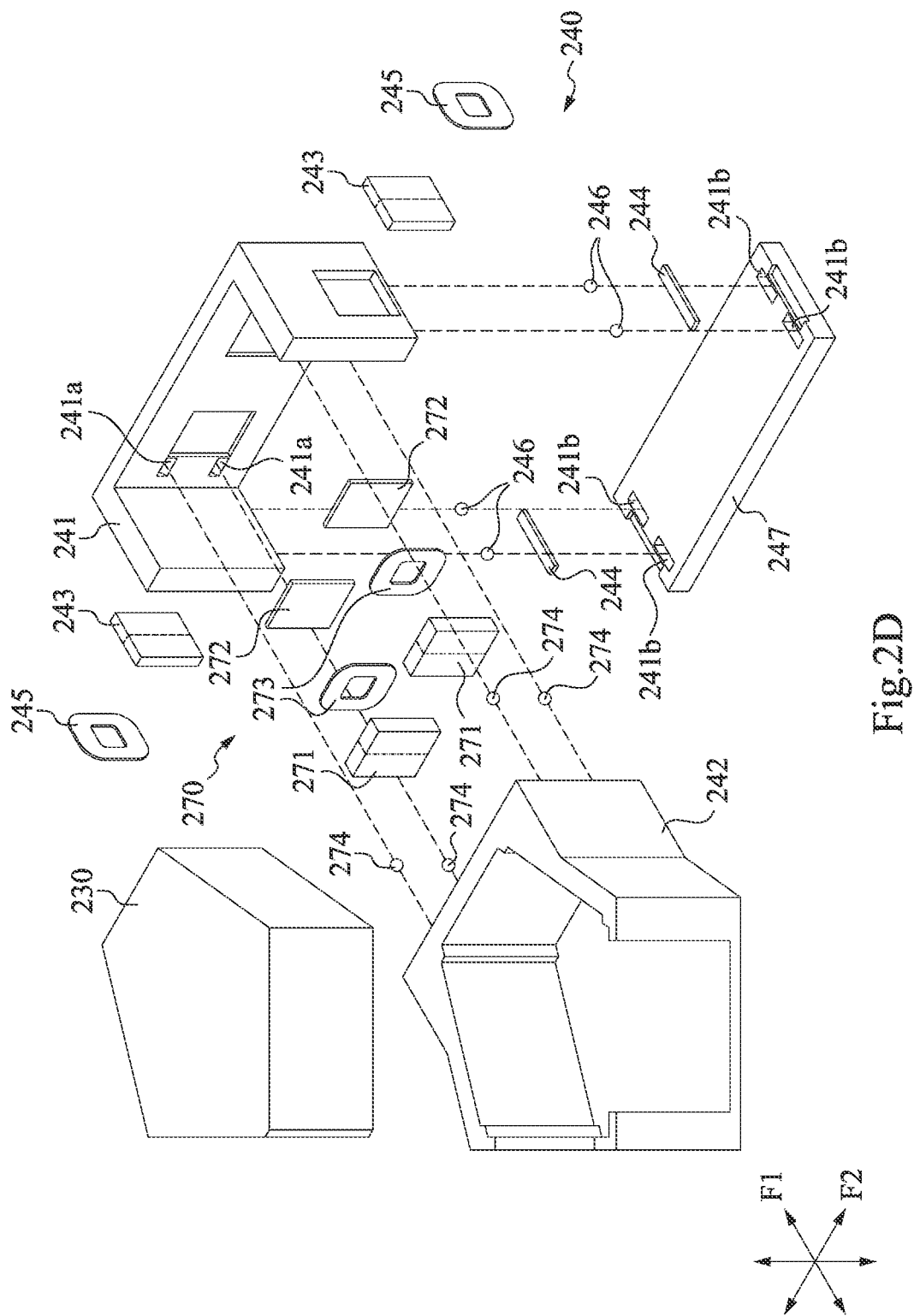
FIG. 2D is an exploded schematic view of the first reflecting member, the first driving apparatus and the second driving apparatus according to the 2nd example in FIG. 2A.
Figure 2E:
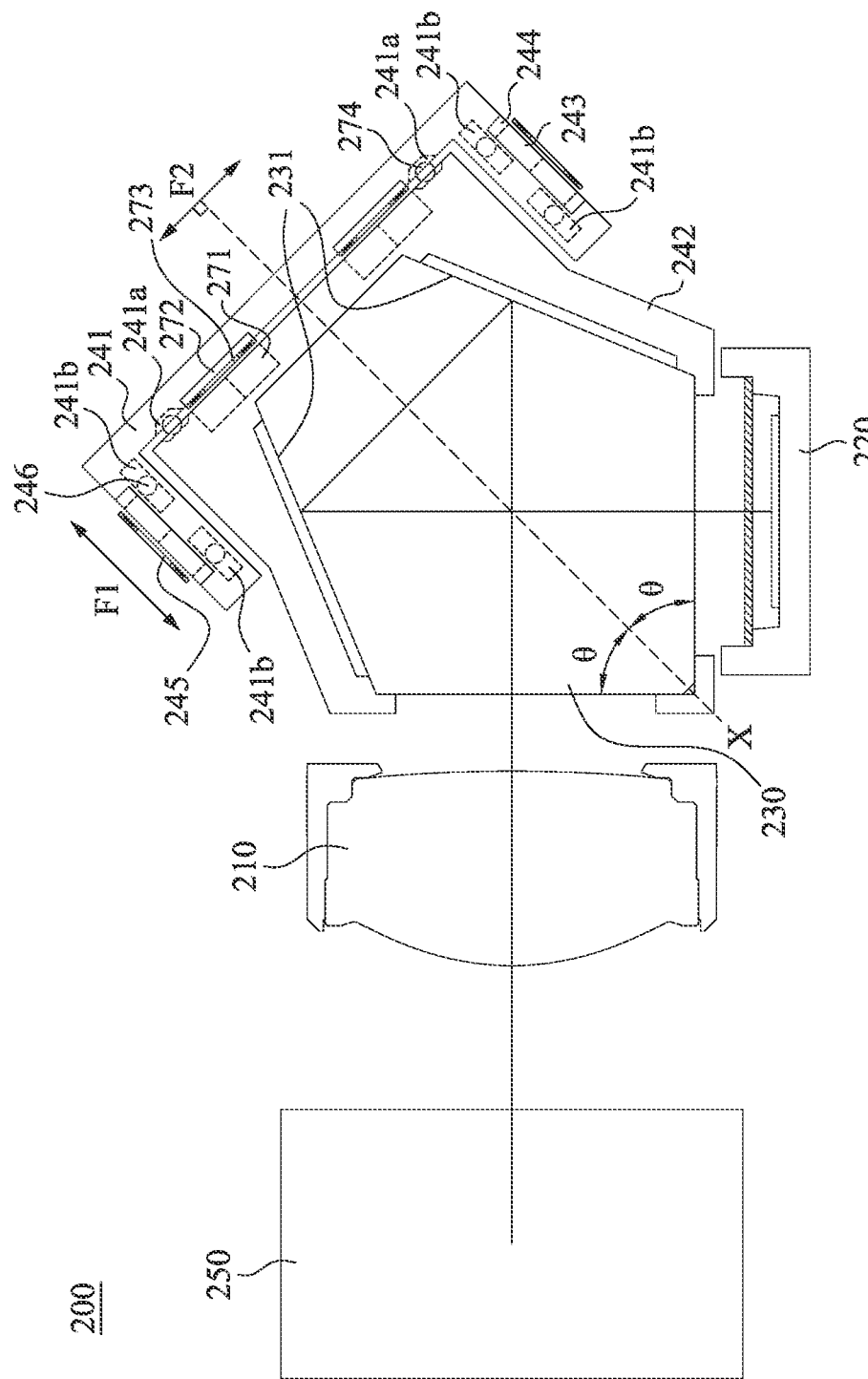
FIG. 2E is a top view of the camera module according to the 2nd example in FIG. 2A.

FIG. 2C is a partially schematic view of the camera module 200 according to the 2nd example in FIG. 2A. In FIG. 2C, the first reflecting member 230 includes an incident surface A, an exiting surface B and at least two reflecting surfaces 231 (as shown in FIG. 2E), wherein the imaging light can be folded from the incident surface A to the exiting surface B, and the reflecting surfaces 231 move towards a same direction via the first driving apparatus 240. Therefore, the volume of the camera module 200 can be substantially reduced via the structure of secondary reflection. In detail, the first reflecting member 230 can be made of a plastic material or a glass material. According to the 2nd example, the first reflecting member 230 is made of the glass material, but is not limited thereto.

The first driving apparatus 240 can include a supporting member 241, a moving holder 242, at least one magnet, at least one magnetic member, a coil, a plurality of rolling members and a holder 247. FIG. 2D is an exploded schematic view of the first reflecting member 230, the first driving apparatus 240 and the second driving apparatus 270 according to the 2nd example in FIG. 2A. In FIG. 2D, according to the 2nd example, the first driving apparatus 240 includes the supporting member 241, the moving holder 242, a first magnet 243, a first magnetic member 244, first coils 245, first rolling members 246 and the holder 247, and the second driving apparatus 270 includes a second magnet 271, a second magnetic member 272, second coils 273 and second rolling members 274.

According to the 2nd example, a number of the first magnets 243 is two, a number of the first magnetic members 244 is two, a number of the first coils 245 is two, a number of the first rolling members 246 is four, a number of the second magnets 271 is two, a number of the second magnetic members 272 is two, a number of the second coils 273 is two, a number of the second rolling members 274 is four, but are not limited thereto.

In detail, the first reflecting member 230 is assembled on the moving holder 242, and the first reflecting member 230 relatively moves between the supporting member 241 and the moving holder 242. The magnets are disposed on the moving holder 242. The magnetic members are disposed on the supporting member 241, and the magnetic members are corresponding to the magnets. A magnetic force is formed between the magnets and the magnetic members. According to the 2nd example, each of the first magnets 243 and the second magnets 271 is disposed on the supporting member 241 and the moving holder 242, each of the first magnetic members 244 and the second magnetic members 272 is disposed on the holder 247 and the supporting member 241, the first magnets 243 are corresponding to the first magnetic members 244, and the second magnets 271 are corresponding to the second magnetic members 272. The magnetic force is formed between the first magnets 243 and the first magnetic members 244, and the magnetic force is formed between the second magnets 271 and the second magnetic members 272. Both of the magnetic force between the first magnets 243 and the first magnetic members 244 and the magnetic force between the second magnets 271 and the second magnetic members 272 are the forces attracting each other. Therefore, the preloading force between the moving holder 242 and the supporting member 241 can be provided, and it is favorable for enhancing the structural stability of the first driving apparatus 240 and the second driving apparatus 270.

FIG. 2E is a top view of the camera module 200 according to the 2nd example in FIG. 2A. In FIGS. 2D and 2E, each of the first driving apparatus 240 and the second driving apparatus 270 is for driving the first reflecting member 230 moving along two translational degrees of freedom, and each of the translational degrees of freedom is a first translational degree of freedom F1 and a second translational degree of freedom F2. Therefore, it is favorable for obtaining the optical image stabilization of the camera module 200. In particular, the degree of freedom can include surge, sway, heave, pitch, yaw and roll, wherein surge, sway and heave are classified as the translational degree of freedom, and pitch, yaw and roll are classified as the rotational degree of freedom.

In detail, the first reflecting member 230 has the first translational degree of freedom F1, and the first driving apparatus 240 is for driving the first reflecting member 230 moving along the first translational degree of freedom F1. That is, the first reflecting member 230 can move along the specific direction at the specific surface, and the driving displacement of the first reflecting member 230 along the first translational degree of freedom F1 is smaller than a variation of back focal length of the camera module 200. Furthermore, the first translational degree of freedom F1 is provided between the supporting member 241 and the holder 247, and a driving force is formed along the first translational degree of freedom F1 via the coil with the magnets. According to the 2nd example, the driving force is formed along the first translational degree of freedom F1 via the first coil 245 with the first magnets 243. Therefore, the autofocus function of the camera module 200 can be obtained.

The first reflecting member 230 has the second translational degree of freedom F2, and the first translational degree of freedom F1 and the second translational degree of freedom F2 are substantially orthogonal. Therefore, the moving ability of the first reflecting member 230 at the two-dimensional surface can be provided, and the imaging light can be more flexibly controlled. Moreover, the second translational degree of freedom F2 is provided between the supporting member 241 and the moving holder 242, and the second driving apparatus 270 is for driving the first reflecting member 230 moving along the second translational degree of freedom F2. Therefore, it is favorable for obtaining the optical image stabilization.

In FIGS. 2D and 2E, a groove can be included between the supporting member 241 and the moving holder 242. According to the 2nd example, grooves 241a are included between the supporting member 241 and the moving holder 242, and grooves 241b are included between the supporting member 241 and the holder 247. According to the 2nd example, a number of the grooves 241a is four, and a number of the grooves 241b is four, but are not limited thereto.

Furthermore, the grooves 241b extend along the first translational degree of freedom F1, the grooves 241a extend along the second translational degree of freedom F2, and each of the rolling members is disposed on each of the grooves 241a, 241b. According to the 2nd example, each of the first rolling members 246 is disposed on each of the grooves 241b, and each of the second rolling members 274 is disposed on each of the grooves 241a. Therefore, the skew situation caused by the first driving apparatus 240 and the second driving apparatus 270 can be improved to increase the linear stability of the movement.

In FIG. 2E, the reflecting surfaces 231, the magnetic members and the magnets are symmetrical arranged, and the reflecting surfaces 231, the magnetic members and the magnets are symmetrical arranged along a symmetry axis X, respectively. According to the 2nd example, the reflecting surfaces 231, the first magnets 243, the first magnetic members 244, the second magnets 271 and the second magnetic members 272 are symmetrical arranged, and the reflecting surfaces 231, the first magnets 243, the first magnetic members 244, the second magnets 271 and the second magnetic members 272 are symmetrical arranged along the symmetry axis X, respectively. Therefore, the assembling difficulty of the camera module 200 can be simplified, and the skew situation during the assembly and the production of the camera module 200 can be avoided to promote the production yield rate of the entire camera module 200.

Moreover, an angle θ is between the incident surface A and the symmetry axis X and between the exiting surface B and the symmetry axis X, respectively. Further, the angle θ is 45 degrees, but is not limited thereto.

Figure 2G:
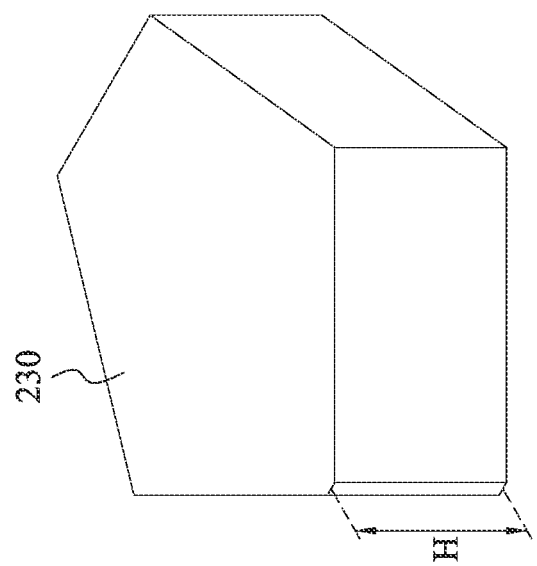
FIG. 2G is a schematic view of parameters of the first reflecting member according to the 2nd example in FIG. 2A.
Figure 2F:
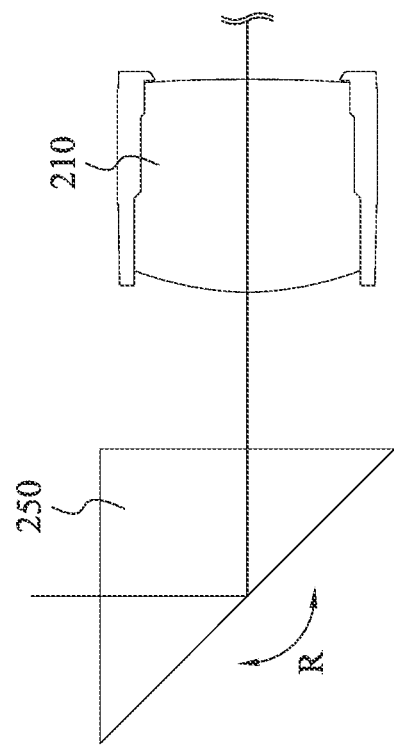
FIG. 2F is a schematic view of the rotational degree of freedom of the second reflecting member according to the 2nd example in FIG. 2A.

FIG. 2F is a schematic view of the rotational degree of freedom R of the second reflecting member 250 according to the 2nd example in FIG. 2A. In FIG. 2F, the second reflecting member 250 has the rotational degree of freedom R, and the third driving apparatus is for driving the second reflecting member 250 rotating along the rotational degree of freedom R. In particular, the third driving apparatus is for driving the second reflecting member 250 rotating along the axis vertical to the incident light path and the exit light path. Therefore, the optical image stabilization of the camera module 200 in another dimension can be obtained.

FIG. 2G is a schematic view of parameters of the first reflecting member 230 according to the 2nd example in FIG. 2A. In FIGS. 2A and 2G, according to the 2nd example, when a refractive index of the first reflecting member 230 at d-line is N, a wavelength of d-line is 587.6 nm, a thickness of the first reflecting member 230 is H, a length of the camera module 200 is L, and a width of the camera module 200 is W, the following conditions of the Table 2 are satisfied.

TABLE 2

| 2nd example | | | |
|---|---|---|---|
| N | 1.95 | W (mm) | 21.0 |
| H (mm) | 5.0 | L/W | 1.64 |
| L (mm) | 34.5 | | |

3rd Example

Figure 3A:
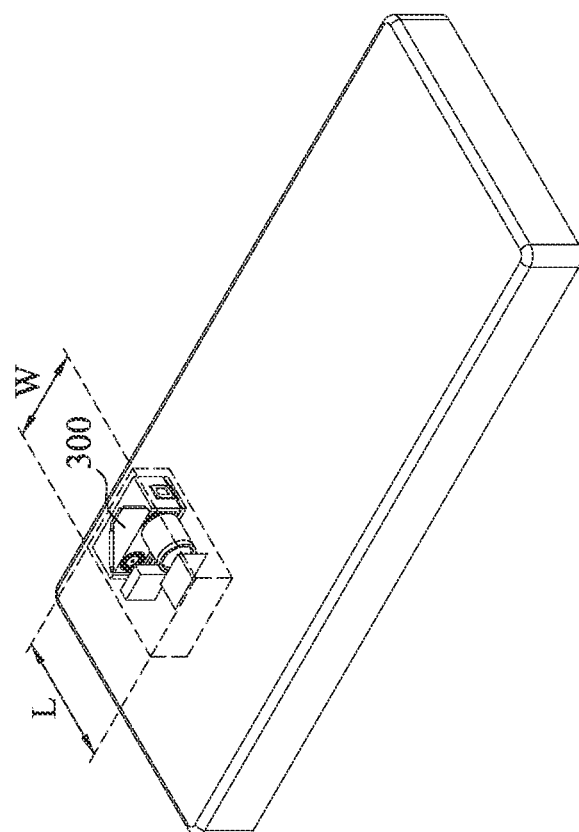
FIG. 3A is a schematic view of an electronic device according to the 3rd example of the present disclosure.
Figure 3B:
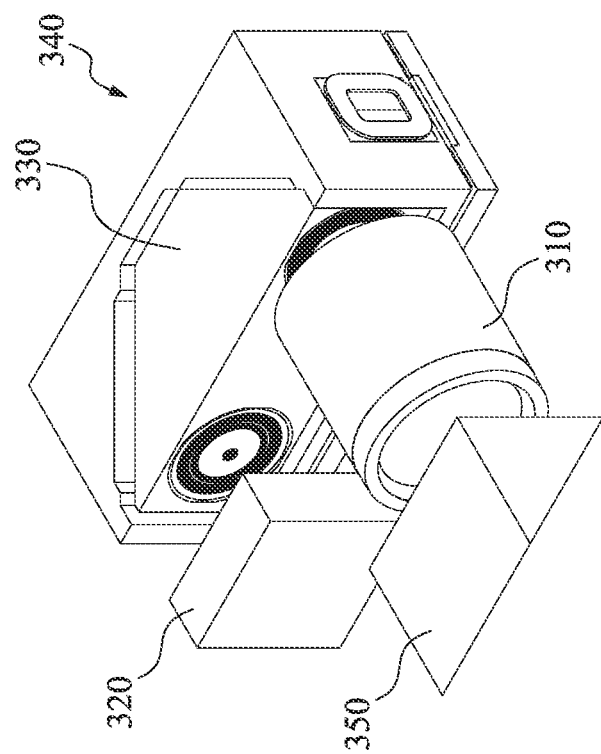
FIG. 3B is a schematic view of a camera module according to the 3rd example in FIG. 3A.

FIG. 3A is a schematic view of an electronic device 30 according to the 3rd example of the present disclosure. FIG. 3B is a schematic view of a camera module 300 according to the 3rd example in FIG. 3A. In FIGS. 3A and 3B, the electronic device 30 includes the camera module 300, and the camera module 300 includes an imaging lens assembly 310, an image sensor 320, a first reflecting member 330, a first driving apparatus 340, a second reflecting member 350 and a third driving apparatus (not shown), wherein the third driving apparatus is an object-side driving apparatus, and the second reflecting member 350 is an object-side reflecting member. The first driving apparatus 340 can be at least one of an autofocus driving apparatus and an optical image stabilization driving apparatus, and the imaging lens assembly 310 can be a telephoto lens assembly with long focal length, but are not limited thereto.

The imaging lens assembly 310 is for converging an imaging light on an image surface (not shown), and the image sensor 320 is disposed on the image surface. The first reflecting member 330 is located on an image side of the imaging lens assembly 310, assembled on the first driving apparatus 340, and for folding the imaging light. In detail, the imaging light enters the camera module 300 from an incident surface (its reference numeral is omitted) of the second reflecting member 350, and the imaging light is converged on the image surface via the imaging lens assembly 310. The first driving apparatus 340 has the function of the autofocus, and the third driving apparatus have the function of the optical image stabilization.

In FIG. 3B, each of the imaging lens assembly 310 and the image sensor 320 has a fixed relative position, and the first reflecting member 330 moves correspondingly to the imaging lens assembly 310 and the image sensor 320. Therefore, it is favorable for lowering the complexity of the assembling process and enhancing the assembling efficiency.

Furthermore, when the first reflecting member 330 is close to the imaging lens assembly 310, the first reflecting member 330 is simultaneously close to the image sensor 320; when the first reflecting member 330 is away from the imaging lens assembly 310, the first reflecting member 330 is simultaneously away from the image sensor 320. In particular, the camera module 300 for driving the first reflecting member 330 can be provided via the present disclosure, and it is favorable for shortening an operation distance of the first driving apparatus 340 and the third driving apparatus to more quickly control the image.

The entire space can be reduced via the first reflecting member 330 to obtain the more efficient space application, and the feasibility of the compact size of the camera module 300 can be provided. It should be mentioned that the long-driving-path function is hardly obtained when the telephoto lens assembly has the higher focal variations. Therefore, the present disclosure is favorable for solving the aforementioned problem, that is, the focusable range of the telephoto lens assembly can be widened.

Figure 3C:
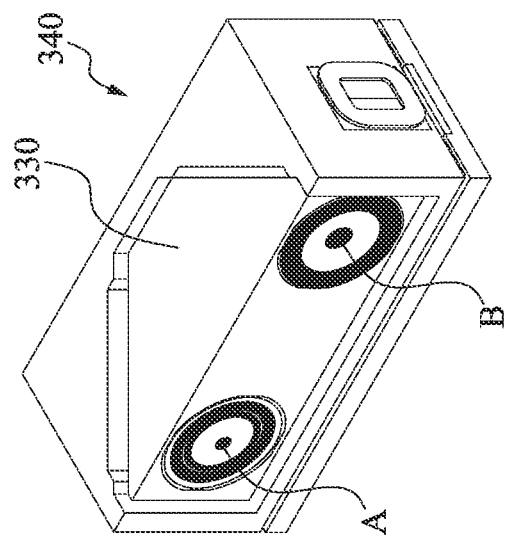
FIG. 3C is a partially schematic view of the camera module according to the 3rd example in FIG. 3A.
Figure 3D:
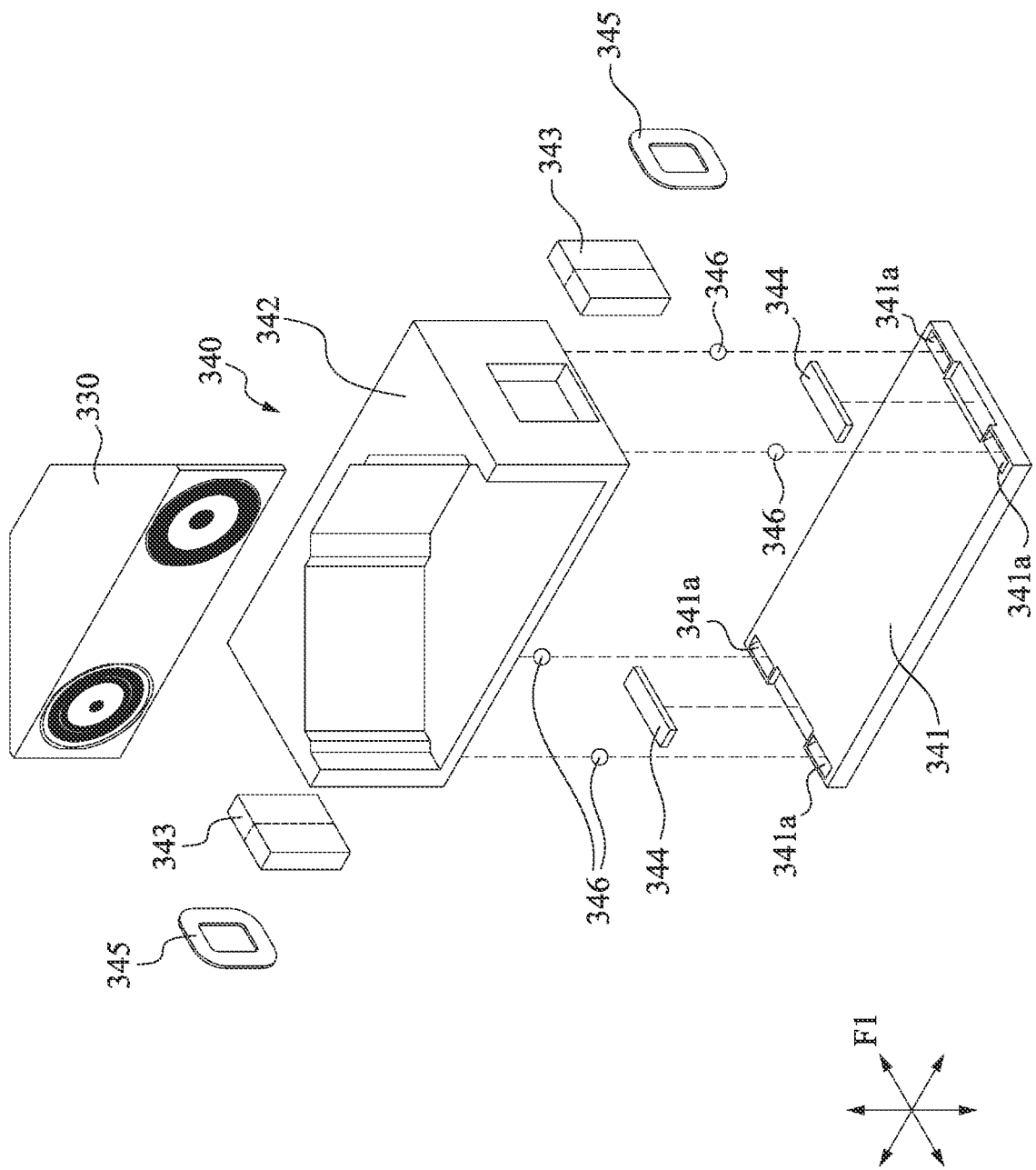
FIG. 3D is an exploded schematic view of the first reflecting member and the first driving apparatus according to the 3rd example in FIG. 3A.
Figure 3E:
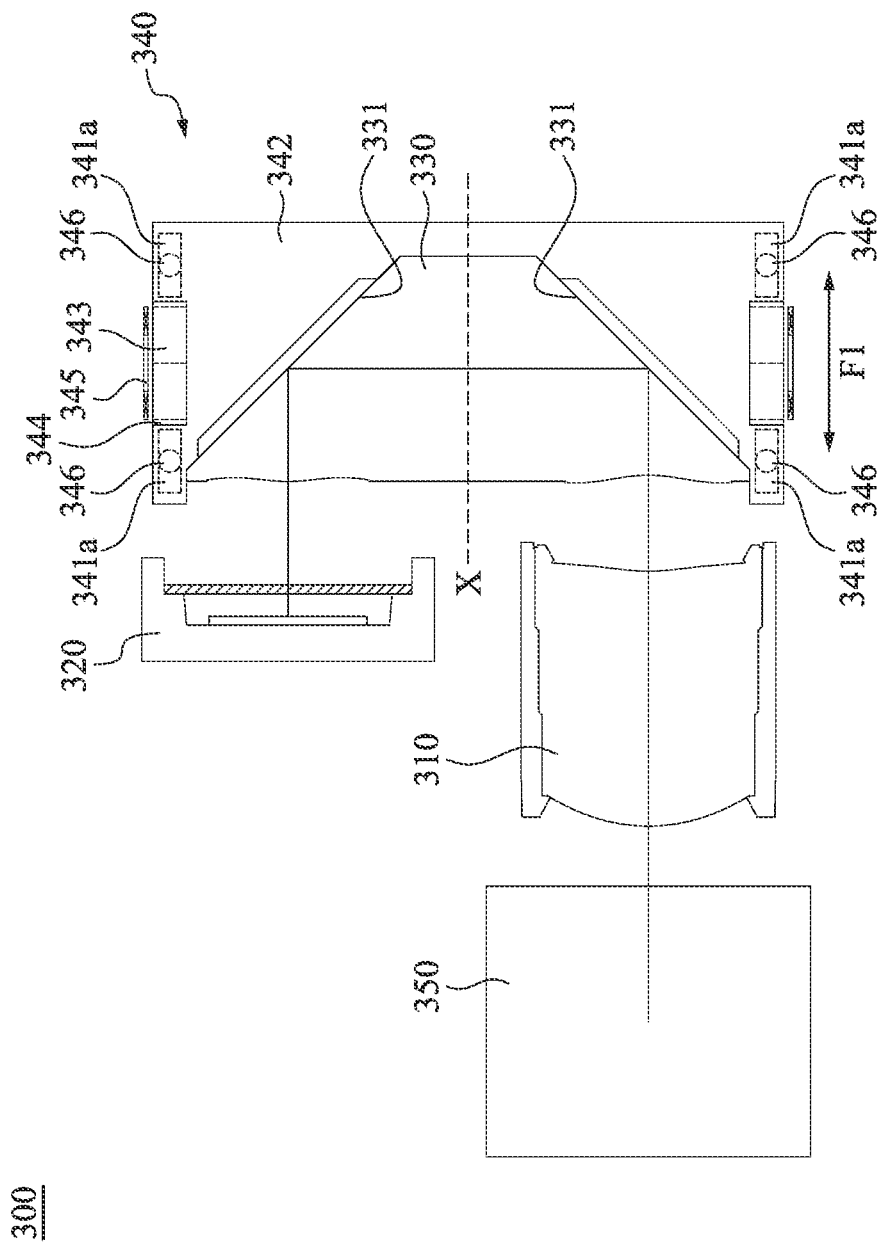
FIG. 3E is a top view of the camera module according to the 3rd example in FIG. 3A.

FIG. 3C is a partially schematic view of the camera module 300 according to the 3rd example in FIG. 3A. In FIG. 3C, the first reflecting member 330 includes an incident surface A, an exiting surface B and at least two reflecting surfaces 331 (as shown in FIG. 3E), wherein the imaging light can be folded from the incident surface A to the exiting surface B, and the reflecting surfaces 331 move towards a same direction via the first driving apparatus 340. Therefore, the volume of the camera module 300 can be substantially reduced via the structure of secondary reflection. In detail, the first reflecting member 330 can be made of a plastic material or a glass material. According to the 3rd example, the first reflecting member 330 is made of the plastic material, but is not limited thereto. Therefore, the camera module 300 has the design flexibility under the consideration of optical design, and it is favorable for developing the plastic material with high refractivity and lowering the developing threshold of the optical element with double reflecting surface.

Furthermore, at least one of the incident surface A and the exiting surface B of the first reflecting member 330 has an aspheric surface. According to the 3rd example, both of the incident surface A and the exiting surface B have aspheric surfaces, but are not limited thereto. Therefore, the first reflecting member 330 can have refractive power to compensate optical aberrations.

The first driving apparatus 340 can include a supporting member 341, a moving holder 342, at least one magnet, at least one magnetic member, a coil and a plurality of rolling members. FIG. 3D is an exploded schematic view of the first reflecting member 330 and the first driving apparatus 340 according to the 3rd example in FIG. 3A. In FIG. 3D, according to the 3rd example, the first driving apparatus 340 includes the supporting member 341, the moving holder 342, a first magnet 343, a first magnetic member 344, first coils 345 and first rolling members 346, wherein the supporting member 341 also has the function of a holder.

According to the 3rd example, a number of the first magnets 343 is two, a number of the first magnetic members 344 is two, a number of the first coils 345 is two, a number of the first rolling members 346 is four, but are not limited thereto.

In detail, the first reflecting member 330 is assembled on the moving holder 342, and the first reflecting member 330 relatively moves between the moving holder 342 and the supporting member 341. The magnets are disposed on the moving holder 342. The magnetic members are disposed on the supporting member 341, and the magnetic members are corresponding to the magnets. A magnetic force is formed between the magnets and the magnetic members. According to the 3rd example, the first magnets 343 are disposed on the moving holder 342, the first magnetic members 344 are disposed on the supporting member 341, the first magnets 343 are corresponding to the first magnetic members 344. The magnetic force is formed between the first magnets 343 and the first magnetic members 344. The magnetic force between the first magnets 343 and the first magnetic members 344 is the forces attracting each other. Therefore, the preloading force between the moving holder 342 and the supporting member 341 can be provided, and it is favorable for enhancing the structural stability of the first driving apparatus 340.

FIG. 3E is a top view of the camera module 300 according to the 3rd example in FIG. 3A. In FIGS. 3D and 3E, the first driving apparatus 340 is for driving the first reflecting member 330 moving along a first translational degree of freedom F1. Therefore, it is favorable for obtaining the optical image stabilization of the camera module 300. In particular, the degree of freedom can include surge, sway, heave, pitch, yaw and roll, wherein surge, sway and heave are classified as the translational degree of freedom, and pitch, yaw and roll are classified as the rotational degree of freedom.

In detail, the first reflecting member 330 has the first translational degree of freedom F1, and the first driving apparatus 340 is for driving the first reflecting member 330 moving along the first translational degree of freedom F1. That is, the first reflecting member 330 can move along the specific direction at the specific surface, and the driving displacement of the first reflecting member 330 along the first translational degree of freedom F1 is smaller than a variation of back focal length of the camera module 300. Furthermore, the first translational degree of freedom F1 is provided between the supporting member 341 and the moving holder 342, and a driving force is formed along the first translational degree of freedom F1 via the coil with the magnets. According to the 3rd example, the driving force is formed along the first translational degree of freedom F1 via the first coil 345 with the first magnets 343. Therefore, the autofocus function of the camera module 300 can be obtained.

In FIGS. 3D and 3E, a groove can be included between the supporting member 341 and the moving holder 342. According to the 3rd example, grooves 341a are included between the supporting member 341 and the moving holder 342. According to the 3rd example, a number of the grooves 341a is four, but is not limited thereto.

Furthermore, the grooves 341a extend along the first translational degree of freedom F1, and each of the rolling members is disposed on each of the grooves 341a. According to the 3rd example, each of the first rolling members 346 is disposed on each of the grooves 341a. Therefore, the skew situation caused by the first driving apparatus 340 can be improved to increase the linear stability of the movement.

In FIG. 3E, the reflecting surfaces 331, the magnetic members and the magnets are symmetrical arranged, and the reflecting surfaces 331, the magnetic members and the magnets are symmetrical arranged along a symmetry axis X, respectively. According to the 3rd example, the reflecting surfaces 331, the first magnets 343 and the first magnetic members 344 are symmetrical arranged, and the reflecting surfaces 331, the first magnets 343 and the first magnetic members 344 are symmetrical arranged along the symmetry axis X, respectively. Therefore, the assembling difficulty of the camera module 300 can be simplified, and the skew situation during the assembly and the production of the camera module 300 can be avoided to promote the production yield rate of the entire camera module 300.

Figure 3G:
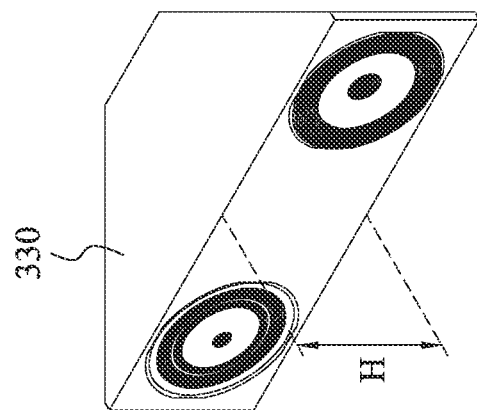
FIG. 3G is a schematic view of parameters of the first reflecting member according to the 3rd example in FIG. 3A.
Figure 3F:
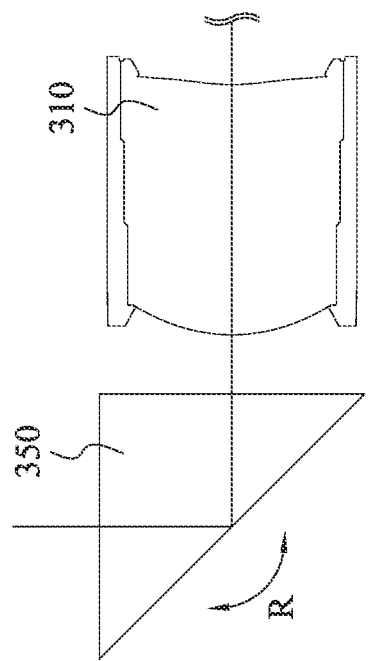
FIG. 3F is a schematic view of the rotational degree of freedom of the second reflecting member according to the 3rd example in FIG. 3A.

FIG. 3F is a schematic view of the rotational degree of freedom R of the second reflecting member 350 according to the 3rd example in FIG. 3A. In FIG. 3F, the second reflecting member 350 has the rotational degree of freedom R, and the third driving apparatus is for driving the second reflecting member 350 rotating along the rotational degree of freedom R. In particular, the third driving apparatus is for driving the second reflecting member 350 rotating along the axis vertical to the incident light path and the exit light path. Therefore, the optical image stabilization of the camera module 300 in another dimension can be obtained.

FIG. 3G is a schematic view of parameters of the first reflecting member 330 according to the 3rd example in FIG. 3A. In FIGS. 3A and 3G, according to the 3rd example, when a refractive index of the first reflecting member 330 at d-line is N, a wavelength of d-line is 587.6 nm, a thickness of the first reflecting member 330 is H, a length of the camera module 300 is L, and a width of the camera module 300 is W, the following conditions of the Table 3 are satisfied.

TABLE 3

| 3rd example | | | |
|---|---|---|---|
| N | 1.68 | W (mm) | 15.6 |
| H (mm) | 4.0 | L/W | 1.42 |
| L (mm) | 22.2 | | |

4th Example

Figure 4A:
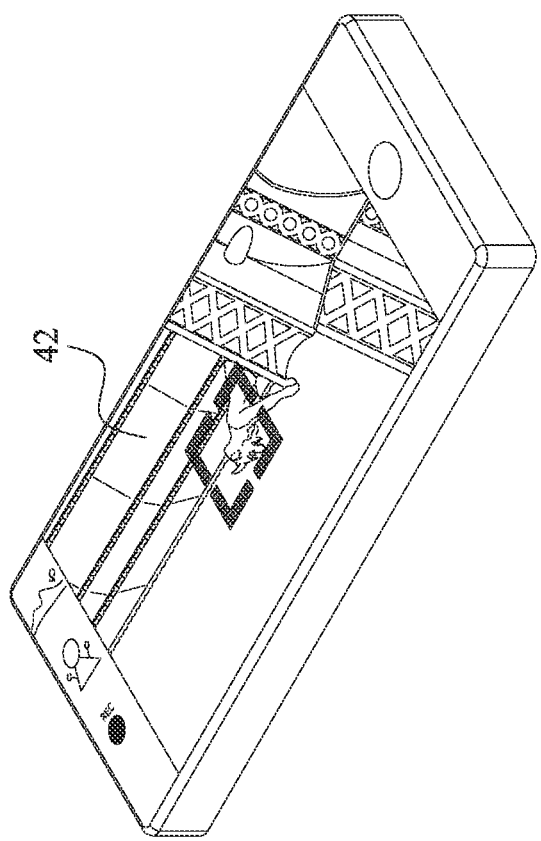
FIG. 4A is a schematic view of an electronic device according to the 4th example of the present disclosure.
Figure 4B:
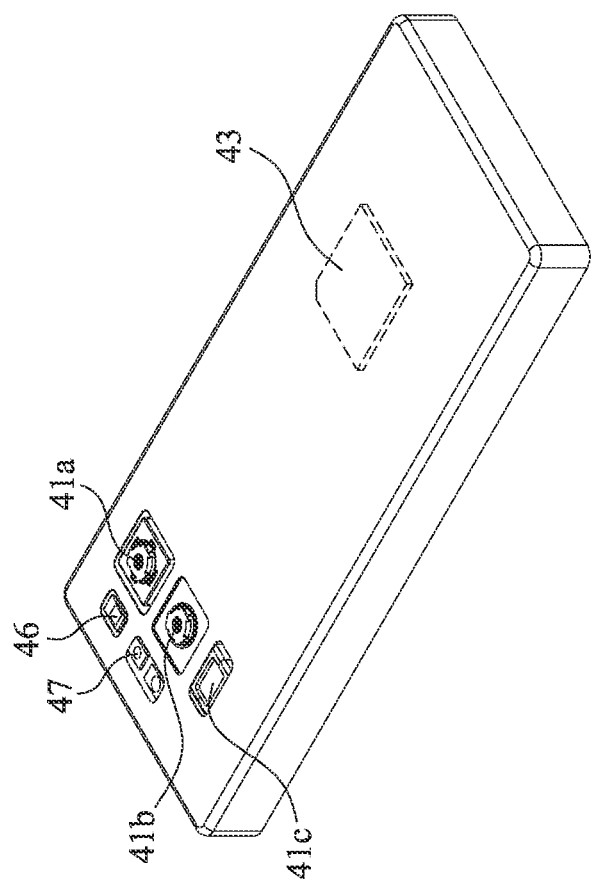
FIG. 4B is another schematic view of the electronic device according to the 4th example in FIG. 4A.
Figure 4C:
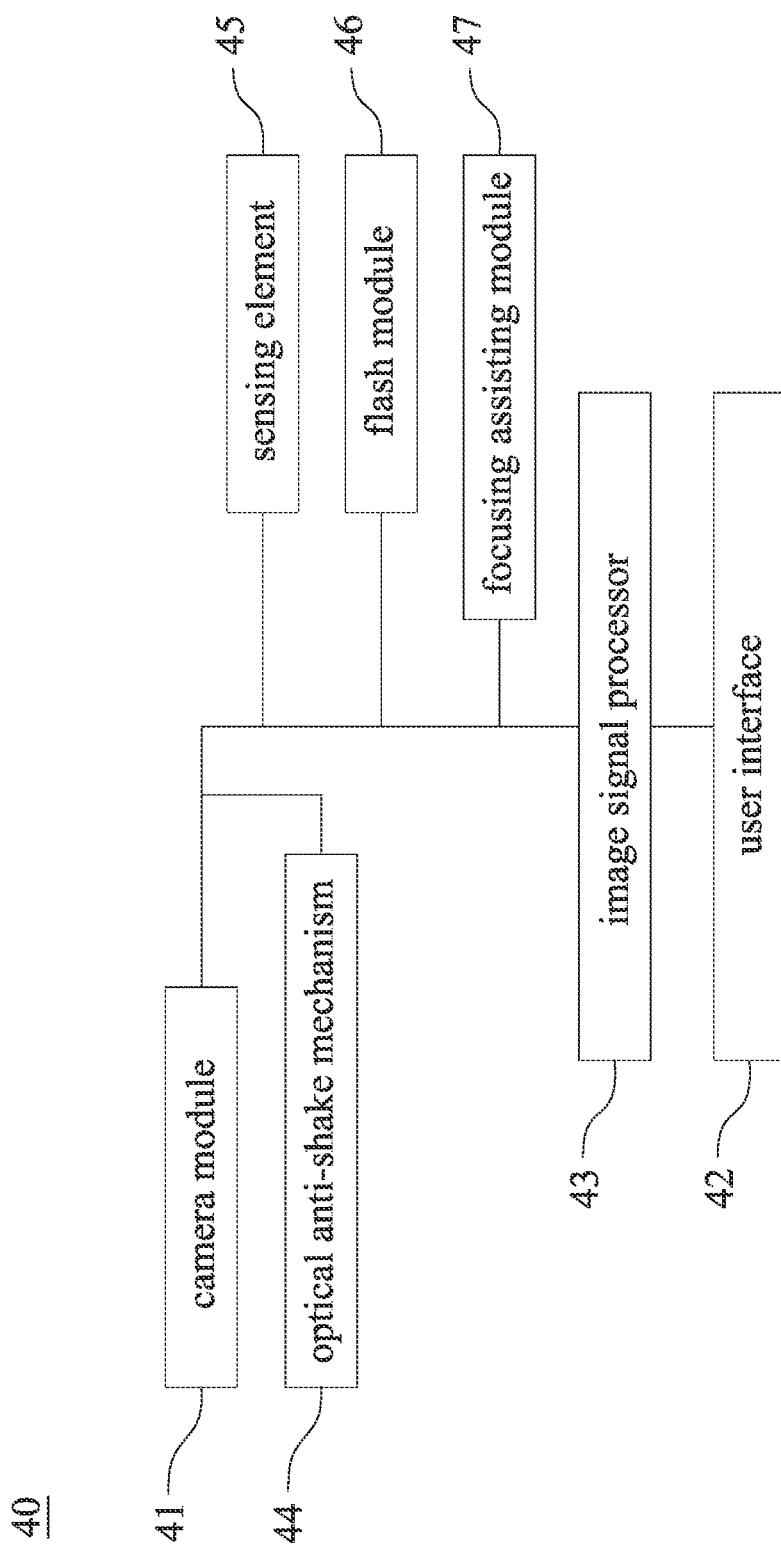
FIG. 4C is a block diagram of the electronic device according to the 4th example in FIG. 4A.

FIG. 4A is a schematic view of an electronic device 40 according to the 4th example of the present disclosure. FIG. 4B is another schematic view of the electronic device 40 according to the 4th example in FIG. 4A. In FIGS. 4A and 4B, the electronic device 40 is a smart phone, and includes a camera module 41 (as shown in FIG. 4C), wherein the camera module 41 includes a ultra-wide angle camera module 41a, a high resolution camera module 41b and a telephoto camera module 41c, and the telephoto camera module 41c can be one of the camera modules according to the aforementioned 1st example to the 3rd example, but is not limited thereto. Therefore, it is favorable for satisfying the requirements of the mass production and the appearance of the camera modules mounted on the electronic devices according to the current marketplace of the electronic device.

Moreover, users enter a shooting mode via the user interface 42 of the electronic device 40, wherein the user interface 42 according to the 4th example can be a touch screen for displaying the scene and have the touch function, and the shooting angle can be manually adjusted to switch the ultra-wide angle camera 41a, the high resolution camera module 41b and the telephoto camera module 41c. At this moment, the imaging light is gathered on the image sensor (not shown) via an imaging lens assembly (not shown) of the camera module 41, and an electronic signal about an image is output to an image signal processor (ISP) 43.

FIG. 4C is a block diagram of the electronic device 40 according to the 4th example in FIG. 4A. In FIGS. 4B and 4C, to meet a specification of a camera of the electronic device 40, the electronic device 40 can further include an optical anti-shake mechanism 44. Furthermore, the electronic device 40 can further include at least one focusing assisting module 47 and at least one sensing element 45. The focusing assisting module 47 can be a flash module 46 for compensating a color temperature, an infrared distance measurement component, a laser focus module, etc. The sensing element 45 can have functions for sensing physical momentum and kinetic energy, such as an accelerator, a gyroscope, a Hall Effect Element, to sense shaking or jitters applied by hands of the user or external environments. Accordingly, the imaging lens assembly of the electronic device 40 equipped with an auto-focusing mechanism and the optical anti-shake mechanism 44 can be enhanced to achieve the superior image quality. Furthermore, the electronic device 40 according to the present disclosure can have a capturing function with multiple modes, such as taking optimized selfies, high dynamic range (HDR) under a low light condition, 4K resolution recording, etc. Furthermore, the users can visually see a captured image of the camera through the user interface 42 and manually operate the view finding range on the user interface 42 to achieve the autofocus function of what you see is what you get.

Moreover, the imaging lens assembly, the image sensor, the optical anti-shake mechanism 44, the sensing element 45 and the focusing assisting module 47 can be disposed on a flexible printed circuit board (FPC) (its reference numeral is omitted) and electrically connected with the associated components, such as the imaging signal processor 43, via a connector (not shown) to perform a capturing process. Since the current electronic devices, such as smart phones, have a tendency of being compact, the way of firstly disposing the imaging lens assembly and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens assembly can also be controlled more flexibly via the touch screen of the electronic device. According to the 4th embodiment, the electronic device 40 includes a plurality of sensing elements 45 and a plurality of focusing assisting modules 47. The sensing elements 45 and the focusing assisting modules 47 are disposed on the flexible printed circuit board and at least one other flexible printed circuit board (not shown) and electrically connected with the associated components, such as the image signal processor 43, via corresponding connectors to perform the capturing process. In other embodiments (not shown herein), the sensing elements and the focusing assisting modules can also be disposed on the main board of the electronic device or carrier boards of other types according to requirements of the mechanical design and the circuit layout.

Furthermore, the electronic device 40 can further include, but not be limited to, a display, a control unit, a storage unit, a random access memory (RAM), a read-only memory (ROM), or the combination thereof.

Figure 4D:
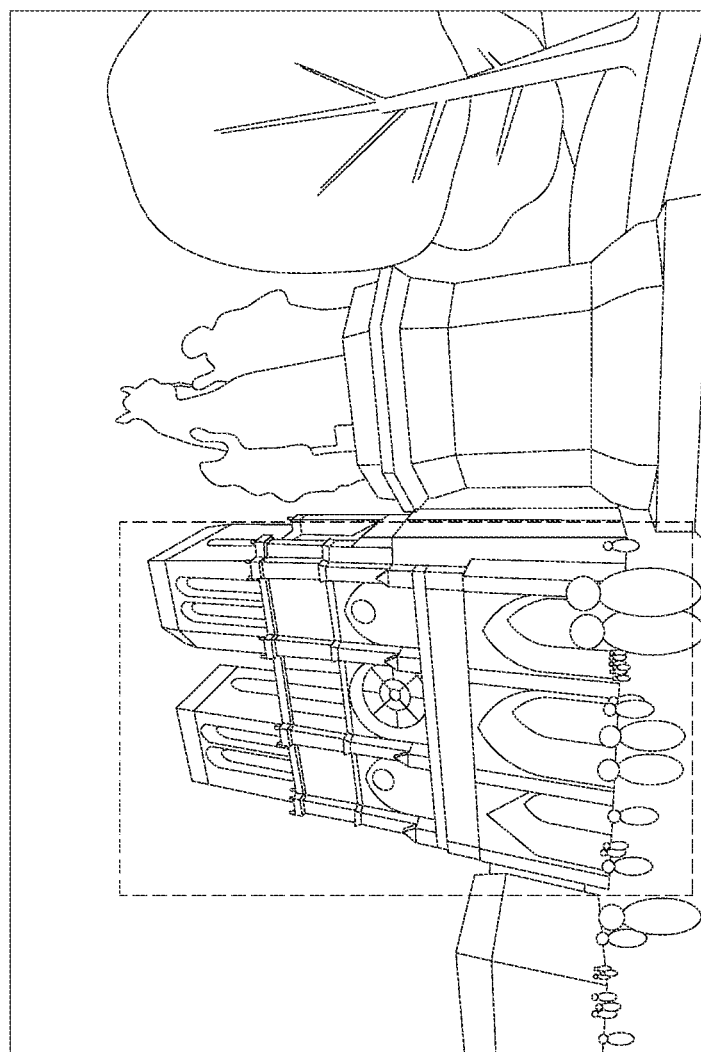
FIG. 4D is a schematic view of an image shot via the ultra-wide angle camera module according to the 4th example in FIG. 4A.

FIG. 4D is a schematic view of an image shot via the ultra-wide angle camera module 41a according to the 4th example in FIG. 4A. In FIG. 4D, the larger range of the image can be captured via the ultra-wide angle camera module 41a, and the ultra-wide angle camera module 41a has the function of accommodating more wide range of the scene.

Figure 4E:
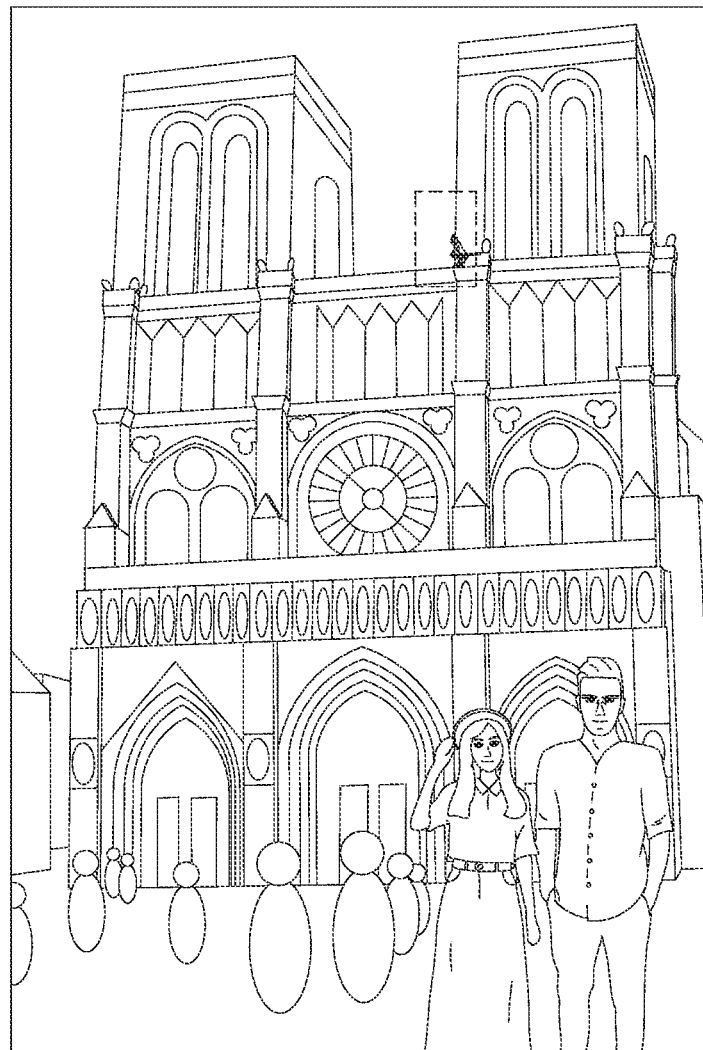
FIG. 4E is a schematic view of an image shot via the high resolution camera module according to the 4th example in FIG. 4A.

FIG. 4E is a schematic view of an image shot via the high resolution camera module 41b according to the 4th example in FIG. 4A. In FIG. 4E, the image of the certain range with the high resolution can be captured via the high resolution camera module 41b, and the high resolution camera module 41b has the function of the high resolution and the low deformation.

Figure 4F:
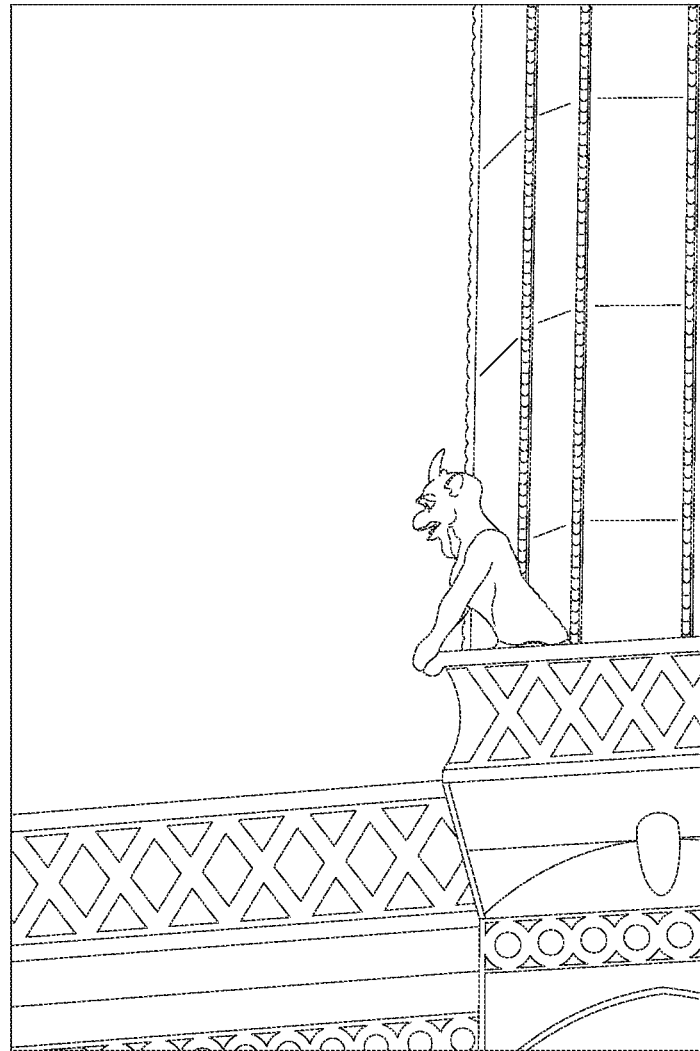
FIG. 4F is a schematic view of an image shot via the telephoto camera module according to the 4th example in FIG. 4A.

FIG. 4F is a schematic view of an image shot via the telephoto camera module 41c according to the 4th example in FIG. 4A. In FIG. 4F, the telephoto camera module 41c has the enlarging function of the high magnification, and the distant image can be captured and enlarged with high magnification via the telephoto camera module 41c.

In FIGS. 4D to 4F, the zooming function can be obtained via the electronic device 40, when the scene is captured via the camera module 41 with different focal lengths cooperated with the function of image processing.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
an imaging lens assembly for converging an imaging light on an image surface, and comprising a plurality of imaging lenses;
an image sensor disposed on the image surface;
a reflecting member located on an image side of one of the imaging lenses of the imaging lens assembly, wherein the reflecting member has at least two reflecting surfaces for folding the imaging light and is single-piece formed; and
a first driving apparatus, the reflecting member assembled on the first driving apparatus, and the first driving apparatus comprising:
a supporting member;
a moving holder, the reflecting member assembled on the moving holder, and the reflecting member relatively moving between the moving holder and the supporting member;
at least one magnet disposed on one of the moving holder and the supporting member; and
at least one magnetic member disposed on the other one of the supporting member and the moving holder, and the magnetic member corresponding to the magnet;
wherein the first driving apparatus further comprises a rolling member, and the rolling member is disposed between the supporting member and the moving holder;
wherein when the reflecting member moves close to the imaging lens assembly, the reflecting member simultaneously moves close to the image sensor; when the reflecting member moves away from the imaging lens assembly, the reflecting member simultaneously moves away from the image sensor.

2. A camera module, comprising:
an imaging lens assembly for converging an imaging light on an image surface, and comprising a plurality of imaging lenses;
an image sensor disposed on the image surface;
a reflecting member located on an image side of one of the imaging lenses of the imaging lens assembly, wherein the reflecting member has at least two reflecting surfaces for folding the imaging light, is single-piece formed, and has a first translational degree of freedom; and
a first driving apparatus, the reflecting member assembled on the first driving apparatus, and the first driving apparatus comprising:
a supporting member;
a moving holder, the reflecting member assembled on the moving holder, and the reflecting member relatively moving between the moving holder and the supporting member;
at least one magnet disposed on one of the moving holder and the supporting member; and
at least one magnetic member disposed on the other one of the supporting member and the moving holder, and the magnetic member corresponding to the magnet;
wherein the at least two reflecting surfaces simultaneously move along the first translational degree of freedom relative to the image sensor via the first driving apparatus;
wherein when the reflecting member moves close to the imaging lens assembly, the reflecting member simultaneously moves close to the image sensor; when the reflecting member moves away from the imaging lens assembly, the reflecting member simultaneously moves away from the image sensor.

3. The camera module of claim 2, wherein the first driving apparatus comprises:
a coil, a driving force formed along the first translational degree of freedom via the coil with the at least one magnet.

4. The camera module of claim 2, wherein the reflecting member has a second translational degree of freedom, and the second translational degree of freedom and the first translational degree of freedom are substantially orthogonal.

5. The camera module of claim 4, further comprising:

a second driving apparatus for driving the reflecting member moving along the second translational degree of freedom.

6. The camera module of claim 2, wherein the reflecting member comprises an incident surface and an exiting surface, and at least one of the incident surface and the exiting surface has an aspheric surface.

7. The camera module of claim 2, wherein a refractive index of the reflecting member at a d-line is N, and the following condition is satisfied:

$1.66 \leq N < 2.5$.

8. The camera module of claim 7, wherein the refractive index of the reflecting member at the d-line is N, and the following condition is satisfied:

$1.70 \leq N < 2.5$.

9. The camera module of claim 2, wherein a thickness of the reflecting member is H, and the following condition is satisfied:

$3.00 \text{ mm} \leq H \leq 10.00 \text{ mm}$.

10. The camera module of claim 2, wherein a length of the camera module is L, a width of the camera module is W, and the following condition is satisfied:

$0.7 < L/W < 3.5$.

11. The camera module of claim 10, wherein the length of the camera module is L, the width of the camera module is W, and the following condition is satisfied:

$0.8 < L/W < 2.5$.

12. An electronic device, comprising:
the camera module of claim 2.

* * * * *